(12) United States Patent
da Silva Junior et al.

(10) Patent No.: US 6,578,129 B1
(45) Date of Patent: Jun. 10, 2003

(54) OPTIMIZED VIRTUAL MEMORY MANAGEMENT FOR DYNAMIC DATA TYPES

(75) Inventors: Julio L. da Silva Junior, Porto Alegre (BR); Francky Catthoor, Temse (BE); Diederik Verkest, Kapellen (BE)

(73) Assignee: IMEC vzw (BE)

( * ) Notice: Subject to any disclaimer, the term of this patent is extended or adjusted under 35 U.S.C. 154(b) by 0 days.

(21) Appl. No.: 09/360,022

(22) Filed: Jul. 23, 1999

Related U.S. Application Data

(60) Provisional application No. 60/094,043, filed on Jul. 24, 1998.

(51) Int. Cl.⁷ ............................................. G06F 12/00

(52) U.S. Cl. ........................ 711/209; 711/203; 707/100

(58) Field of Search .............................. 711/6, 203, 204, 711/205, 206, 207, 208, 209; 707/100

(56) References Cited

U.S. PATENT DOCUMENTS 5,754,738 A * 5/1998 Saucedo et al. .............. 706/11

OTHER PUBLICATIONS

Chou et al., "An Evaluation fo Memory Management Schemes for a Multimemory–Multiprocessor System", Institute of Computer Engineering, National Chiao–Tung University. 1998.*
Zaks, "Dynamic Memeory Management for APL–Likle Languages", Universite de TEchnologie de Compiegne, France. 1973.*

F. Catthoor, et al., "Global Communication And Memory Optimizing Transformations For Low Power Signal Processing Systems", IEEE workshop on VLSI signal processing, La Jolla, CA, Oct. 1994, Also in VLSI Signal Processing VII, J.Rabaey, P. Chau, J.Eldon (eds.), IEEE Press, New York, pp. 178–187, 1994.
R. W. Brodersen, "The Network Computer And Its Future", Proc. IEEE Solid–State Circuits Conf., San Francisco, CA, pp. 32–36, Feb. 1997.
S. Wuytack, F. Catthoor, H. De Man, "Transforming Set Data Types To Power Optimal Data Structures", IEEE Trnasactions on Computer–aided Design, vol. CAD–15, No. 6, pp. 619–629, Jun. 1996.
G. Attardi, T. Flagea, "A Customisable Memory Management Framework", Proc. of the USENIX C++ Conference, Cambridge, MA, 1994. pps. 123–142.
M. Johnstone, P. R. Wilson, "The Memory Fragmentation Problem: Solved?", Proc. of Object–Oriented Programming Systems, Languages and Applications—Wsh. on Garbage Collection and Memory Management, Atlanta, GE, Oct. 1997, pps. 26–36.

(List continued on next page.)

*Primary Examiner*—Matthew Kim
*Assistant Examiner*—Matthew D. Anderson
(74) *Attorney, Agent, or Firm*—Knobbe, Martens, Olson & Bear, LLP

(57) ABSTRACT

The present invention proposes effective solutions for the design of Virtual Memory Management for applications with dynamic data types in an embedded (HW or SW) processor context. A structured search space for VMM mechanisms with orthogonal decision trees is presented. Based on said representation a systematic power exploration methodology is proposed that takes into account characteristics of the applications to prune the search space and guide the choices of a VMM for data dominated applications. A parameterizable model, called Flexible Pools, is proposed. This model limits the exploration of the Virtual Memory organization considerably without limiting the optimization possibilities.

15 Claims, 11 Drawing Sheets

OTHER PUBLICATIONS

S. Wuytack, et al., "Power Exploration For Data Dominated Video Applications", Proc. IEEE Intnl. Symp. on Low Power Design, Monterey, CA, pp. 359–364, Aug. 1996.

P. Slock, et al., "Fast And Extensive System–Level Memory Exploration For ATM Applications", Proceedings $10^{th}$ ACM/IEEE International Symposium on System–Level Synthesis, Antwerp, Belgium, Sep. 1997.

Y. Therasse, G. Petit, and M. Delvaux, VLSI Architecture Of A SDMS/ATM Router, Annales des Telecommunications, 48(3–4), 1993.

P. Purdom, et al., "Statistical Investigation Of Three Storage Allocation Algorithms", BIT, vol. 11, pp. 187–195, Nov. 1971.

J. Peterson, T. Norman, "Buddy Systems", Communications of the ACM, vol. 20, pp. 421–431, Jun. 1977.

C. Stephenson, "Fast Fits: New Methods For Dynamic Storage Allocation", Proc. $9^{th}$ Symposium on Operating Systems Principles, pp. 30–32, Oct. 1983.

K. Itoh, et al., Trends in Low–Power RAM Circuit Technologies, Special Issue on "Low Power electronics" of the Proceedings of the IEEE, vol. 83, No. 4, pp. 524–543, Apr. 1995.

B. Margolin, et al., "Analysis Of Free–Storage Algorithms", IBM Systems Journal, vol. 10, pp. 283–304, Apr. 1971.

* cited by examiner fig. 11

| | Area (\%) | Width (bits) | VMS Size (No. of blocks) |
|---|---|---|---|
| Cell | 62 | 448 | 11200 |
| IPI | 16 | 384 | 3350 |
| RR | 22 | 128 | 13400 | fig. 12

| VMM | Scheme 1 | | | | Scheme 2 | | | | Scheme 3 | | | |
|---|---|---|---|---|---|---|---|---|---|---|---|---|
| | Power VMM (%) | Power LT (%) | Power VMM LT (%) | Power LT (%) | Power VMM (%) | Power LT (%) | Power VMM LT (%) | Power LT (%) | Power VMM (%) | Power LT (%) | Power VMM LT (%) | Power LT (%) |
| Cell | 62 | 28 | 22 | 74 | 61 | 28 |
| IPI | 5.98 | 0.02 | 2.2 | 01 | 6.18 | 0.02 |
| RR | 3.98 | 0.02 | 1.55 | 0.15 | 4.78 | 0.02 |

Fig. 13

| | Scheme 1 | Scheme 2 | Scheme 3 |
|---|---|---|---|
| Cell | 1 | 3.1 | 1 |
| IPI | 1 | 1.05 | 1.05 |
| RR | 1 | 1.09 | 1.09 |
| Total | 1 | 2.89 | 1.01 |

Fig. 14

| QuickLists | Scheme 1 | | Scheme 2 | | Scheme 3 | |
|---|---|---|---|---|---|---|
| Power | Area | Power | Area | Power | Area | Power | Area |
| 2.5 | 0.7 | 1 | 1 | 2.89 | 0.62 | 1.01 | 0.84 |

Total

|         | Area (%) | Width (bits) | VMS Size (No. of blocks) |
|---------|----------|--------------|--------------------------|
| Cell    | 71       | 448          | 256                      |
| Table 1 | 27       | 172          | 256                      |
| Table 2 | 2        | 13           | 256                      |

Fig. 15

|         | Scheme 1 | | Scheme 2 | |
|---------|----------------|----------------|----------------|----------------|
|         | Power LT (%) | Power VMM (%) | Power LT (%) | Power VMM (%) |
| Cell    | 51.7 | 26.9 | 5.5 | 84.4 |
| Table 1 | 18.2 | 2.0  | 1.9 | 6.4  |
| Table 2 | 0.7  | 0.5  | 0.1 | 1.7  |

Fig. 16

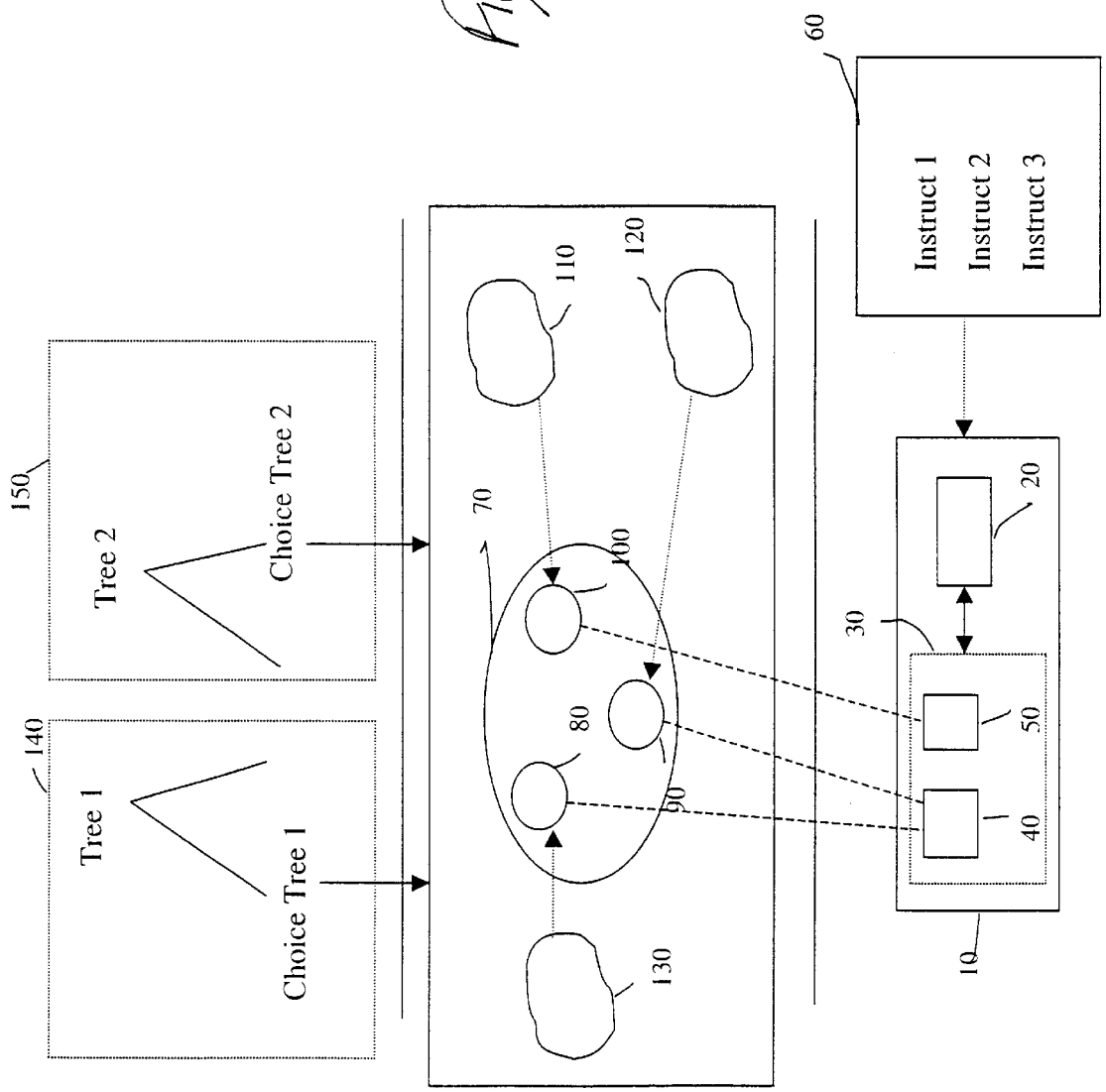

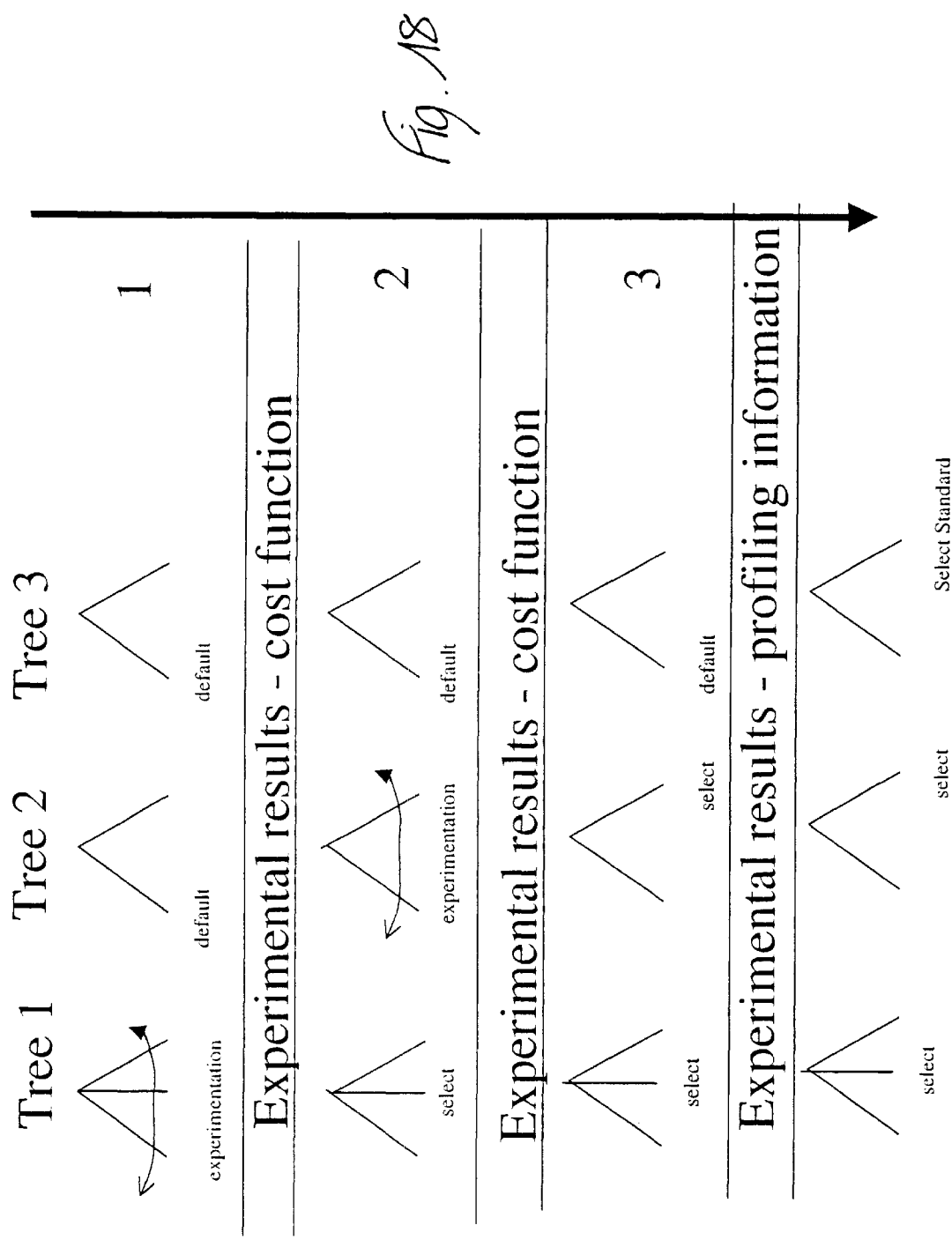

OPTIMIZED VIRTUAL MEMORY MANAGEMENT FOR DYNAMIC DATA TYPES

RELATED APPLICATION

This application claims priority to Provisional Application No. 60/094,043, filed on Jul. 24, 1998.

FIELD OF THE PRESENT INVENTION

Optimal design of virtual memory management schemes for applications with dynamic data types, for instance network components, is presented. Said virtual memory management design fits into an overall dynamic memory management design flow. This flow is part of an overall system design flow for embedded hardware/software processors. The overall design flow focuses on data storage and transfer issues and their relation with power consumption and memory size.

BACKGROUND OF THE PRESENT INVENTION

Virtual memory management deals with the allocating of a memory block (in which data can be stored) for an application request and recycling the memory block when it is not used anymore by the application. As such the virtual memory concept defines an interface between the application and the physical memory used by the application.

As the power consumption of data-dominated applications (applications in which the power consumption is due to the huge amount of data to be processed and not due to the computation or arithmetic complexity) is heavily dominated by data storage and transfers, systematic design methodologies in which the dynamic storage related issues are globally optimized before doing detailed realization of an embedded processor are needed (F. Catthoor, et al., "*Global communication and memory optimizing transformations for low power signal processing systems*", IEEE workshop on VLSI signal processing, La Jolla Calif., October 1994. Also in VLSI Signal Processing VII, J. Rabaey, P. Chau, J. Eldon (eds.), IEEE Press, New York, pp.178–187, 1994.) (V. Tiwari, et al., "*Instruction-level power analysis and optimization of software*", Journal of VLSI Signal Processing, No.13, Kluwer, Boston, pp.223–238, 1996.) (R. W. Brodersen, "*The network computer and its future*", Proc. IEEE Int. Solid-State Circuits Conf., San Francisco, Calif., pp.32–36, February 1997.). It is clear that for data-dominated applications with dynamic data types the optimal design of virtual memory management must be part of such an overall design methodology. For RMSP applications much of the memory management can be decided at compile time while according to the subject matter of the present invention the virtual memory management must deal with the memory organization at run-time.

The optimal design of the virtual memory management can be organized in three steps (further called the dynamic memory management design flow). In a first step abstract data types are refined into concrete data types (abstract data type refinement) (S. Wuytack, F. Catthoor, H. De Man, "*Transforming Set Data Types to Power Optimal Data Structures*", IEEE Transactions on Computer-aided Design, Vol.CAD-15, No.6, pp.619–629, June 1996.). In the second step (the virtual memory management step) defines a number of virtual memory segments (VMSes) and their corresponding custom memory managers. The third step (the physical memory management stage) assigns these VMSes to a number of allocated physical memories. The present invention deals with the second step, the so-called virtual memory management step.

Different virtual memory management schemes are known in the software community (G. Attardi, T. Flagea, "*A Customisable Memory Management Framework*", Proc. of the USENIX C++ Conference, Cambridge, Mass., 1994.) (P. R. Wilson, et al., "*Dynamic Storage Allocation: A Survey and Critical Review*", Proc. Intnl. Wsh. on Memory Management, Kinross, Scotland, UK, September 1995.) but no complete overview of the possible choices is currently available. Moreover for software the main criteria for selection of an appropriate scheme are speed and memory usage whereas for embedded processors power consumption is an important criterion.

In the context of software systems generally applicable (i.e. for all applications, thus not exploiting characteristics of the application) virtual memory management schemes are usual. The only exception is that often the possibility to implement a dedicated virtual memory manager by the user is provided, enabling some exploration. In some cases some libraries of virtual memory management schemes are available (G. Attardi, T. Flagea, "*A Customisable Memory Management Framework*", Proc. of the USENIX C++ Conference, Cambridge, Mass., 1994.). For embedded processors implementing, as focussed in the present invention, a general virtual memory management scheme is not feasible however. A specific scheme for each specific application is necessary.

In the context of software the application is assumed to run on a given hardware architecture while in the present invention virtual memory management design is part of a methodology for design of the hardware. In the software community a given VMM scheme is implemented starting from a predefined memory architecture. For instance, the word size is already defined. Overhead in VMM schemes is likely to be significant, since it is not possible to allocate less than one word for storing information such as used/free or boundary tags. In embedded software or hardware implementations the memory architecture will be defined during the synthesis of the application. For instance, number of memories and memory word sizes are not fixed before synthesis. Thus, overhead can be made as small as the minimum necessary in opposition to fixed architecture target.

In the article by M. Johnstone, P. R. Wilson. "*The Memory Fragmentation Problem: Solved?*", Proc. of Object-Oriented Programming Systems, Languages and Applications—Wsh. on Garbage Collection and Memory Management, Atlanta Ga., October 1997, a broad comparison between different VMM schemes is presented. These VMM schemes are compared based on the fragmentation caused by each of the mechanisms. It is demonstrated that among the six best schemes, fragmentation is nearly the same and very small. Among these cases, fragmentation could be neglected when compared to overhead necessary for implementing the VMM mechanism. It is assumed in the present invention that also the freedom regarding the number of memories to be used, the number of words needed for each memory, and the memory hierarchy is available for further power optimization.

Known memory-oriented synthesis techniques deal with data types which can easily be analyzed at compile time, for instance multi-media signal processing applications dealing with multi-dimensional array signals. The applications, focussed in the present invention, using dynamic data types, such as network components, in which only a little information is available at compile time, cannot be treated in the same manner. Nevertheless, it is important to exploit the small amount of information as much as possible. Previous work on network components (B. Svantesson, et al., "*Modeling and synthesis of operational aid management system (OAM) of ATM switch fabrics*", Proc. 13th Norchip Conf., pp.115–122, November 1995.) (characterized by dynamic data types) has focussed at low abstraction levels but has not dealt with virtual memory management issues.

Other power-oriented work has been focussing on datapath and control logic design ("*Low power CMOS design*", (eds. A. Chandrakasan, R. Brodersen), IEEE Press, 1998.) and programmable processors. For the target field of embedded hardware/software processors no such work is known. Previous algorithm-level low power work (S. Wuytack, et al., "*Power Exploration for Data Dominated Video Applications*", Proc. IEEE Intnl. Symp. on Low Power Design, Monterey Calif., pp.359–364, August 1996.) (P. Slock, et al., "*Fast and Extensive System-Level Memory Exploration for ATM Applications*", Proceedings $10^{th}$ ACM/IEEE International Symposium on System-Level Synthesis, Antwerp, Belgium, September 1997.) has focused on signal processing applications.

As a summary it can be stated that the present invention deals with dedicated (application specific) virtual memory management design for data-dominated applications with dynamic data types as part of design of embedded processors (no fixed architecture is given at the stage of the design dealt with by the methods and systems of the present invention).

AIM OF THE PRESENT INVENTION

An aim of the present invention is to provide a systematic procedure and system for selecting a global optimal virtual memory management, taking into account power consideration besides other criteria such as speed and area by addressing this issue at a higher level of abstraction (before detailed compilation and hardware mapping) and focussing on data-dominated applications with dynamic data types, which must be realized in embedded processors.

SUMMARY OF THE PRESENT INVENTION

One aspect of the present invention is a systematic procedure and system for selecting a global optimal virtual memory management scheme from a novel formalized search space representation. The present invention relates to cost effective virtual memory management design for embedded hardware/software processors and data-dominated applications with dynamic data types. Accesses to memory influence power consumption heavily. The cost criterion comprises essentially of (1) the power consumed by the embedded hardware/software processor while executing said application and (2) the overall (memory) size of said hardware/software processor. The hardware/software processor will further also be denoted (as a digital) device.

As input for the design, (concrete or structured) data-types needed by the application are given. The outcome of the design is a number of virtual memory segments and their corresponding memory managers. A virtual memory segment comprises a group of datatypes. For each of said group of datatypes a virtual memory manager may be designed. It must be emphasized that thus two major steps can be indicated: (1) deciding on the grouping of said datatypes and (2) designing virtual memory managers for each said group.

Virtual memory management schemes in general deal with the allocation of a memory block (in which data types can be stored) for an application request and recycling the memory block when it is not used anymore by the application. The virtual memory management tries to avoid (external and internal) fragmentation of the memory. Note that the virtual memory management defines an interface between the dynamic allocation of data in the application and the physical memory of the processor.

Before cost effective design of the virtual memory management (both grouping of datatypes and virtual memory manager design) can be performed, a clear insight into the distinct design choices must be available. In the present invention the search space is organized as a limited set of decision trees. Selecting a leaf from each of said trees and combining the selected leaves results always in a valid virtual memory management scheme. When design choices which are intermediate the design choices indicated by the leaves are possible, this is explicitly indicated by a mark. As such the set of decision trees with their leaves and marks describes the complete search space by presenting all independent (orthogonal) design choices.

The actual choices to be made by a designer can be guided by (1) using compile-time information (e.g. worst case size of data types), (2) profiling information (e.g. access counts and size of data types) and (3) estimates of the needed memory size and power consumption. Said profiling information is obtained by performing simulations, using input sequences for said application. Said estimation of the needed memory size and power consumption are essentially depending on said profiling information.

The results of said simulations (the profiling information) can depend heavily on the virtual memory management construction used and that said virtual memory management is just under construction here. Therefore, the design methodology requires a simulation environment in which an application can be simulated using a selected virtual memory organization (defining virtual memory segments by deciding which data types are in which pool) and selection for all pools of the corresponding virtual memory managers. From these simulations profiling information of the application under study is extracted. In these simulations real data (input sequences representative for the data that will be used by the application when it is fully realized) is used. These simulations are also called experiments.

A second aspect of the present invention is to present a methodology for optimal design of a virtual memory management, based on exploration of a structured (orthogonal) complete search space of virtual memory organization and management schemes. Said structured (orthogonal) complete search space of virtual memory organization and management schemes is presented as a list of disjunct trees, each representing a design choice. The decision to be made by the designer can be guided either by experiments or can be a standard or default solution. Note that it is the designers choice to determine how to decide. The designer can also decide not to perform an experiment at all.

A third aspect of the present invention is to present a methodology and a design system for optimal design of a virtual memory management, based on exploration of a structured (orthogonal) complete search space of virtual memory organization and management schemes, in such a way that the decision to be made is based either on experiments or a standard solution and the designer determines how to decide.

As indicated above design decisions made can be based on the profiling information found by experiments, based on simulations. Simulations are is in principle only possible when for all design choices a particular choice is made and as such a virtual memory management is determined. But it is these design choices which are under investigation in accordance with the present invention. In the present invention this chicken-and-egg problem is solved as follows. A distinction between the leaf of the tree under consideration and the other leaves is made. Experiments are defined as simulations for which a variety of virtual memory management schemes are used, whereby only said leaf of the tree under consideration is varied. The other leaves, necessary for defining a virtual memory management are fixed. When such a leaf is part of a tree for which already an optimal leaf is determined, naturally said leaf is said optimal leaf. When such a leaf is part of a tree for which an optimal leaf has not yet been determined, a default leaf is used. Naturally, experimenting is only possibly when a suitable simulation environment is available.

A fourth aspect of the present invention is to present a methodology for optimal design of a virtual memory management, based on exploration of a structured (orthogonal) complete search space of virtual memory organization and management schemes, whereby the experiments are performed in a particular way.

The experimentation method presented above fits into a step-by-step approach of virtual memory management design. Moreover, the experimentation method relies heavily on the assumption that choices fixed at a previous step need not be reconsidered while proceeding through the step-by-step method. This is an essential feature of the tree ordering, presented in the present invention further on.

The most important decision in the design of virtual memory management (for dynamic data-type applications) is choosing between one sector (virtual memory segment) per data type or using an entire pool (virtual memory segment) for all types or some intermediate solution. This decision has severe influences on the other choices influencing the cost criterion. The organization of the virtual memory is thus the first decision which must be made. Organizing the virtual memory means deciding on the grouping of datatypes in groups. For each group a virtual memory segment is defined. For each segment a virtual memory manager must be constructed.

A fifth aspect of the present invention is to present a methodology for optimal design of a virtual memory management, based on exploration of a structured (orthogonal) complete search space of virtual memory organization and management schemes, in a step-by-step manner, whereby in a first step a decision on the organization of the virtual memory is made.

In general power consumption models are linear in access count and sublinear in memory size. As power consumption is one of the essential parts of the cost criterion under consideration, the characteristics of the power consumption model influences the virtual memory management design. Indeed, in the present invention a major distinction is made between access dominated and size dominated data types. Note that based on information (compile-time or profiling information obtained from experiments) data types are labeled to be either access dominated or size dominated. In the present invention a particular way of grouping is proposed as a standard solution based on said classification.

A sixth aspect of the present invention is to present the structure of the tree, representing the design choice, related to grouping of datatypes.

A seventh aspect of the present invention is that it is proposed to place each access count dominated data type in a separate group (pool, sector, virtual memory segment) and to group all size dominated data types in one group (pool, sector, virtual memory segment).

An eighth aspect of the present invention is as second step in virtual memory management design deciding for each grouping of datatypes which type of index ordering will be used.

A ninth aspect of the present invention is to present the structure of the tree, representing the design choices, related to index ordering.

A tenth aspect of the present invention is that it is proposed for access count dominated data types to use index ordering.

A third step in virtual memory management design is to decide for each grouping of datatypes which type of merging and splitting policy is made.

A eleventh aspect of the present invention is that in the methodology for optimal design of a virtual memory management, the decision about merging and splitting for each group of datatypes is recognized as the third decision to be taken.

A structure for each of said disjunct decision trees is proposed. Said trees are organized hierarchically and thus comprise several branches, subbranches and leaves. Leaves are the lowest elements of said trees in said hierarchical ordering. Marks indicate whether intermediate design choices between the design choices, represented by leaves or branches are possible.

Another approach for designing a cost effective virtual memory management is instead of exploring the full design space, defining a parametrizable virtual memory manager model and tuning the parameters of this model for the application under consideration. As such a limited search space, spanned by the parameters, is defined. Naturally the model must be chosen such that the cost optimization is still feasible.

A twelfth aspect of the present invention is that a method for designing an optimal virtual memory manager which is based on tuning of a parametrizable virtual memory management model is presented.

A thirteenth aspect of the present invention is that a particular virtual memory management model is presented.

To summarize it can be stated that in the present invention a systematic design methodology and design system for cost effective virtual memory management is presented. The methodology and system are based on a representation of all possible design choices as a limited set of disjunct trees. Selection of a leaf of each of said disjunct trees defines a valid virtual memory management. Said limited set of disjunct trees is presented. In the present invention it is recognized that selection of a leaf of one of said trees, depends either on experiments or is just a standard leaf selection. In the present invention a particular way of experimenting is disclosed. Said experimentation approach fits into a step-by-step design procedure. In the present invention it is recognized that virtual memory organization is the first basic step. The tree, representing said design choice, is presented. A standard leaf selection, representing an ad-hoc design rule for organizing the virtual memory is also given. Next index-ordering is put forward as the second decision to be taken. The tree, representing said design choice, is presented. An ad-hoc solution for access count dominated datatypes is presented. Further deciding on the merging and splitting policy is presented as the third decision to be taken. The structure of each of said disjunct trees are presented. Another design approach is based on a parametrizable model for the virtual memory. The parameters of this model can be explored during design. Both this method and a particular model are presented.

The present invention can be formalized as follows:

A method for designing an optimal virtual memory management for an application, comprising the steps of:

representing all virtual memory management design choices in a set of disjunct trees, each of said trees presenting an orthogonal design choice, the leaves of a tree representing the design options of the corresponding design choice, such that any combination of said leaves from said disjunct trees defines a valid virtual memory management, whereby said combination comprises one said leaf from each of said disjunct trees; and selecting from all disjunct trees one leaf, thereby defining said optimal virtual memory management.

The application is to be executed on an essentially digital circuit or device. It is this digital circuit or device which is under design or construction in accordance with the present invention. The virtual memory management design task is part of the overall design flow for said digital circuit or device. Therefore, the present invention can also be described as a method for designing an optimal virtual memory management for an application to be executed on an essentially digital circuit.

Said virtual memory management being designed is optimal with respect to an optimization function. For example, at least the power consumption of said digital device while said application is being executed on said digital device is taken into account. Further the total memory size can be part of said optimization function.

A virtual memory manager can be described as a set of rules or policies being used while dealing with memory occupation. However, virtual memory management does not deal directly with the physical memory of said digital device or circuit but with a virtual memory. The assignment of the physical memory of said digital device to said virtual memory is done after the virtual memory design. The virtual memory manager defines a plurality of virtual memory segments. The physical memory comprises a plurality of physical memories. The assignment can be one physical memory for one virtual memory segment but this is certainly not necessary.

Therefore, the present invention can also be described as a method for designing an optimal virtual memory management for an application to be executed on an essentially digital circuit, said optimal virtual memory management being related to the physical memory of said digital circuit.

FIG. 17 shows as an example a digital device (10), comprising a processor (20) and a physical memory (30). The physical memory comprises two physical memories (40), (50). On said digital device (10) an application runs or is executed. Said application is represented as a set of instructions (60). A part of said instructions are operations on variables and thus invoke memory manipulations. The virtual memory (70) comprises in this example of three virtual memory segments (80), (90), (100). Each of said virtual memory segments are a grouping of variables involved in the execution of said application. Note that the actual assignment of memory to said groups of variables is not based on a one physical memory for one virtual memory segment relationship. To each of said virtual memory segments a set of rules (110), (120), (130), defining the memory management policy of said virtual memory segments is associated.

The choice of how to group the variables or datatypes involved in the execution of the application and the selecting of the virtual memory management of each of said groups defines the virtual memory management design problem.

In the present invention the design choices are represented as a set of disjunct trees (e.g., tree 1 (130) and tree 2 (140) in the example), being orthogonal to each other, meaning that the selection of a leaf of a tree is always possible irrespective of the choice of a leaf of another tree without affecting the result. However, the order of selection may influence the result. It must be emphasized that the orthogonality of said trees concerns the possibility to select a leaf, and not about the actual choice of the leaves while determining an optimal virtual memory management with respect to an optimization function. It can be said that any combination of said leaves of said disjunct trees defines a valid virtual memory management, meaning that such combination can be realized in practice.

The set of disjunct tree can be enumerated as follows:

a tree, representing how the virtual memory is organized;
a tree, representing the fit policy;
a tree, representing the match policy;
a tree, representing the block size of free blocks;
a tree, representing free block tracking policy;
a tree, representing the index ordering policy;
a tree, representing the freeing used blocks policy;
a tree, representing the block splitting policy;
a tree, representing the block size used in the splitting policy;
a tree, representing the part of the free block used first in the splitting policy;
a tree, representing the index ordering used in the splitting policy;
a tree, representing the block merging policy;
a tree, representing the block size used in the merging policy;
a tree, representing the amount of merging to be done;
a tree, representing the index ordering used in the merging policy; and
a tree, representing the recording policy.

A method being based on a tree by tree optimization is exploited. The selection of one leaf of a tree may be based either on experiments or a standard leaf selection.

FIG. 18 shows an example of said tree by tree optimization. The search space is here represented by three disjunct trees. The tree ordering is indicated with their tree number. The first tree has three design options. The second and third tree have each two design options. The arrow from top to bottom indicates the different steps during the design procedure. In a first step experiments are performed by extracting experimental results (being values of the optimization function) for the different design options represented by tree one while default design options are selected from the other trees. From said experimental results the designer makes a conclusion about the design choice to be selected for the first tree. In a second step again experiments are performed by extracting experimental results for the different design options represented by tree two while using the selected design choice of tree one and a default design option for tree three. The last step of the example shows that the previous kind of experimentation is not necessarily needed. Indeed, for the selection of a design choice of tree three just a standard design choice is selected. Such a standard design choice can be based on knowledge of the application, for instance also extracted via some other type of experimentation, for instance determining profiling information about the data types.

The approach via extracting values of the optimization function is described as follows. The selection of one leaf of a tree, based on experiments further comprises the steps of:
loading said application in a simulation environment,
enabling performance of experiments for said application
combined with a variety of experimental virtual memory
managements;
performing experiments whereby all leaves of said tree from which one leaf will be selected are selected once, for all trees of said set of disjunct trees, except said tree from which one leaf will be selected, an optimal leaf is selected when available, otherwise a default leaf is selected, said selected leaves of all said disjunct trees defining an experimental virtual memory management;
calculating the cost criterion for each experiment; and
selecting said leaf resulting in the most optimal cost criterion.

The tree related to the virtual memory organization is the first one to be treated in the tree by tree approach and has a particular structure as described below. The tree representing how the virtual memory is organized comprises:
a first leaf, representing a first design choice such that for each datatype of said application another pool is used;
a second leaf, representing a second design choice such that all datatypes of said application are in one pool; and
a mark, indicating that each design choice in between said first and second design choice is valid.

Next a standard leaf selection approach is presented. Indeed after experimentation with a default virtual memory management, some properties or knowledge of the application is extracted, for example access count and size of data types. From this knowledge a leaf selection is determined without extracting information of the optimization function. Such an approach can be described as follows: The determination of the organization of the virtual memory, comprises:
grouping all datatypes in one pool;
performing an experiment with a default virtual memory manager for said pool;
indicating for each datatype whether its is access count dominated or size dominated;
defining for each access count dominated datatype a pool; and
defining one pool for all size dominated datatypes.

The tree related to the index ordering policy is the second one to be treated in the tree by tree approach and also has a particular structure. The tree representing the index ordering policy comprises:
a first leaf, representing a first design choice, such that no index is used; and
a second leaf, representing a second design choice, such that an index is used.

A standard leaf selection for access count dominated data types is presented. Notice that this requires again some experimentation in order to determine which data types are access count dominated with either a default virtual memory manager or potentially a virtual memory manager wherein already the design choices of the first design step is taken into account. The index ordering policy of the virtual memory manager for an access count dominated datatype uses an index.

The tree related to the merging and splitting policy is the third one to be treated in the tree by tree approach. In this third step, leaves are selected from the trees related to the block merging and block splitting policy, thereby no ordering of said trees, related to merging and splitting must be respected when selecting said leaves.

The structure of the trees is depicted below:

The tree, representing the block size of free blocks, comprises:
a first leaf representing that said block size of free blocks is fixed;
a second leaf, representing that said block size of free blocks is free.

The tree, representing the free block tracking policy, comprises:
a first branch, representing the use of lookup tables;
a second branch, representing the use of link fields said branches are connected by a mark;
said first branch comprises a first leaf, representing the use of state variables, and a second leaf, representing the use of tables;
said second branch comprises a first leaf, representing a simple linked approach and a second leaf, representing a double linked approach.

The tree, representing the index ordering policy, comprises:
a first leaf, representing that no index is used;
a branch, representing completely indexing;
said first leaf and branch are connected by a mark said branch, comprises a first leaf, representing address indexing, a second leaf, representing size indexing and a third leaf, representing other indexing approach; said leaves are connected by a mark.

The tree, representing the recording policy, comprises:
a first leaf, representing no recording;
a branch, representing recording via a header;
a second leaf, representing recording via boundary tags;
said branch, comprises a first leaf, representing that the block size is recorded, a second leaf, representing that whether the block is free or not is recorded and a third leaf, representing that other information is recorded.

The tree, representing how the virtual memory is organized, comprises:
a first leaf, representing that for each datatype another pool is used;
a second leaf, representing that all datatypes are in one pool;
said leaves are connected by a mark.

The tree, representing the match policy, comprises:
a first leaf, representing an exact match policy;
a second leaf, representing an approximate match policy.

The tree, representing a fit policy, comprises:
a first leaf, representing a first fit policy;
a second leaf, representing a next fit policy;
a third leaf, representing a best fit policy;
a fourth leaf, representing a worst fit policy;
said third and fourth leaf are connected by a mark.

The tree, representing the freeing used blocks policy, comprises:
a first leaf, representing a LIFO ordering approach;
a second leaf, representing a FIFO ordering approach;
a third leaf, representing an indexed ordering approach;
said first and second leaf are connected by a mark.

The tree, representing the block splitting policy, comprises:
a first leaf, representing an approach that never splits;
a second leaf, representing an approach, which always splits;
said leaves are connected by a mark.

The tree, representing the block size used in the splitting policy, comprises:
a first leaf, representing small block sizes;
a second leaf, representing large block sizes;
said leaves are connected by a mark.

The tree, representing the part of the free block used in the splitting policy, comprises:
a first leaf, representing that the first part of the block is used;
a second leaf, representing that the last part of the block is used;

said leaves are connected by a mark.

The tree, representing the index ordering used in the splitting policy, comprises:
a first leaf, representing that the index ordering is respected;
a second leaf, representing that no index is respected.

The tree, representing the block merging policy, comprises:
a first leaf, representing immediate block merging;
a second leaf, representing never merging;
a branch, representing deferred merging;
said branch, comprising of a second leaf, representing waiting for a fixed amount of requests, a third leaf representing waiting for a variable amount of requests, and a fourth leaf, representing waiting for an unsatisfied request.

The tree, representing the block size used in the merging policy, comprises:
a first leaf, representing a large block size;
a second leaf, representing a small block size;
said leaves are connected with a mark.

The tree, representing the amount of merging to be done, comprises:
a first leaf, representing that all mergeable blocks are merged;
a second leaf, representing that enough merging is done to satisfy a request;
said leaves are connected with a mark.

The tree, representing the index ordering used in the merging policy, comprises:
a first leaf, representing that the index is respected;
a second leaf, representing that no index is respected.

The further formalized description below refer to the optimal design method based on a parametrizable model. The present invention includes a method and a system for designing an optimal virtual memory management for an application, comprising:
loading said application in a simulation environment, enabling performing of experiments for said application combined with a virtual memory management;
defining a virtual memory management model with a set of parameters;
performing experiments using a default virtual memory management; and
selecting said parameters based on said experiments.

In this method said virtual memory management model consists of
pools of a first kind and pools of a second kind;
said pools of a first kind acts as cache for said pools of a second kind;
said pools of a first kind consists of:
pools of a first type with a variable number of blocks;
pools of a second type with a fixed number of blocks; and
the number of pools of the first type, the number of pools of the second type, the number of blocks in the pools of the second type, the initial number of blocks in the pools of the first type, the number of pools of a second kind and the size of the blocks in said pools of a second kind are parameters of said virtual memory management model.

The blocks are connected either in a list, a binary tree or a pointer array. The pools of a second type are used for access count dominated datatypes and said pools of a first type are used for size dominated datatypes. The number of blocks transferred between pools of a first kind and pools of a second kind and vice versa, is a parameter of said virtual memory management.

Naturally the approach via the parametrized model fits in the general approach as each parameter of said model can be represented by tree, with a first leaf, indicating a minimum value and a second leaf, indicating a maximum value, and a mark, indicating that intermediate value between said minimum and maximum value are possible. By definition said trees are disjunct and every selection of said parameters and thus leaf selection defines a valid memory management. Therefore the approach via the parametrized model can be formalized as follows: each of said trees of said set of disjunct trees is related uniquely to the parameters of a virtual memory management model. The virtual memory management model may consists:
pools of a first kind and pools of a second kind;
said pools of a first kind acts as cache for said pools of a second kind;
said pools of a first kind consists of:
pools of a first type with a variable number of blocks;
pools of a second type with a fixed number of blocks; and
said set of disjunct trees comprises at least of:
a tree related to the number of pools of the first type;
a tree related to the number of pools of the second type;
a tree related to the number of blocks in the pools of the second type;
a tree related to the initial number of blocks in the pools of the first type
tree related to the number of pools of a second kind and the size of the blocks in said pools of a second kind are parameters of said virtual memory management model.

BRIEF DESCRIPTION OF THE DRAWINGS

FIG. 11 shows the datatypes in the SPP Application.

FIG. 12: SPP—Power distribution using 3 VMM mechanisms.

FIG. 13: SPP—Power comparison of 3 VMM mechanisms.

FIG. 14: SPP—Power/Area trade-off of 4 VMM mechanisms.

FIG. 15 shows the datatypes in the F4 Application.

FIG. 16: F4—Power distribution using 2 VMM mechanisms.

FIG. 17: Relations between the digital circuit under construction (10) with its physical memories (40), (50), its functionality described by code (60), the virtual memory (70) with its virtual memory segments (80)(90)(100) and their corresponding management rules (130)(120)(110) and the search tree representation, being a set of disjunct trees.

FIG. 18: Tree-by-tree optimization. Three steps of a tree-by-tree optimization is shown. The search space is represented by three disjunct trees. In a first step experimentation with the first tree is performed. In such experimentation, values of an optimization function are extracted for different selection of leaves of said first tree while default leaves are selected for the other trees. Finally one leaf of said first tree is selected. In a second step the same procedure is used for the second tree but the first tree leaf selection is used while the third tree leaf is a default leaf The third step is an illustration of another kind of experimentation. Using the selected leaves of tree one and two an experiment is performed. With said experiment characteristics (profiling information) of the application, for instance which datatypes are access count dominated or size dominated, are determined. From said characteristics a leaf is selected via a standard selection. The selected leaves of said three trees represent a valid virtual memory management, being optimized with respect to an optimization function.

DETAILED DESCRIPTION OF THE PRESENT INVENTION

Target Applications

In the present invention applications are targeted that require manipulation of large amounts of data that are dynamically created and destroyed at run time, such as protocol processing applications. These applications are characterized by tight interaction between control and dataflow behavior, intensive data storage and transfers, and stringent real-time requirements. Due to this, the transport layers of these applications are usually (partly) realized in hardware or embedded software. In the embedded processor design for the target domain, a large part of the area is due to memory units (Y. Therasse, G. Petit, and M. Delvaux. "*VLSI architecture of a SDMS/ATM router*", Annales des Telecommunications, 48(3–4), 1993.). Also the power for such data-dominated applications is heavily dominated by the storage and transfers (F. Catthoor, et al., "*Global communication and memory optimizing transformations for low power signal processing systems*", IEEE workshop on VLSI signal processing, La Jolla Calif., October 1994. Also in VLSI Signal Processing VII, J. Rabaey, P. Chau, J. Eldon (eds.), IEEE Press, New York, pp. 178–187, 1994.) (V. Tiwari, et al., "*Instruction-level power analysis and optimization of software*", Journal of VLSI Signal Processing, No.13, Kluwer, Boston, pp.223–238, 1996.)

Given the data storage and transfers importance, a systematic design methodology in which the dynamic storage related issues are globally optimized as a first step, before doing the software/hardware or processor partitioning and the detailed compilation on an embedded processor, or the scheduling, data-path and controller synthesis for custom hardware mapping, is required. This preprocessing supports exploration of different data types for Abstract Data Types (ADTs) (S. Wuytack, F. Catthoor, H. De Man, "*Transforming Set Data Types to Power Optimal Data Structures*", IEEE Transactions on Computer-aided Design, Vol.CAD-15, No.6, pp.619–629, June 1996.) and exploration of Virtual Memory Management (VMM) mechanisms for these data types, abstracting them from physical memory implementations. The present invention relates to virtual memory management issues.

Dynamic Memory Management Design Flow

Figure 1:
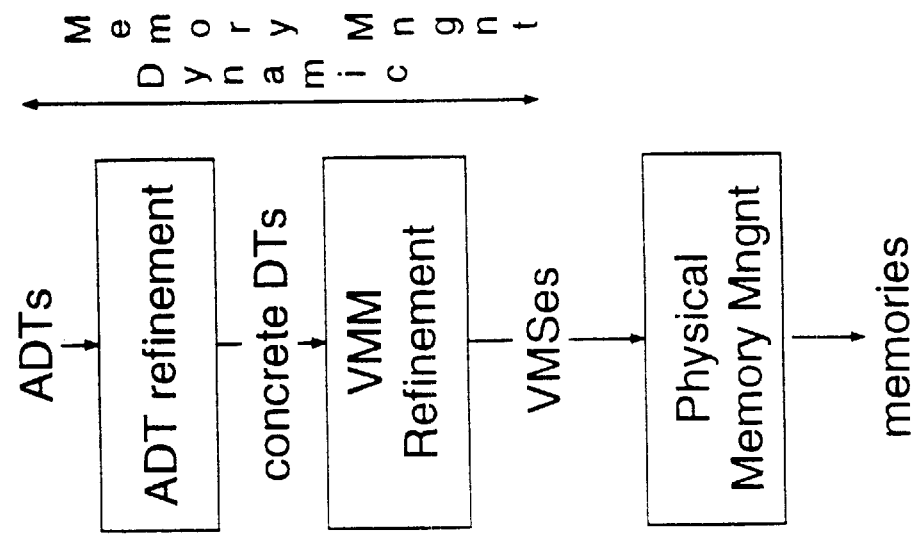
FIG. 1 shows the dynamic memory management design flow, comprising of Abstract Data Type refinement, Virtual memory management design and physical memory mapping.
Figure 1:
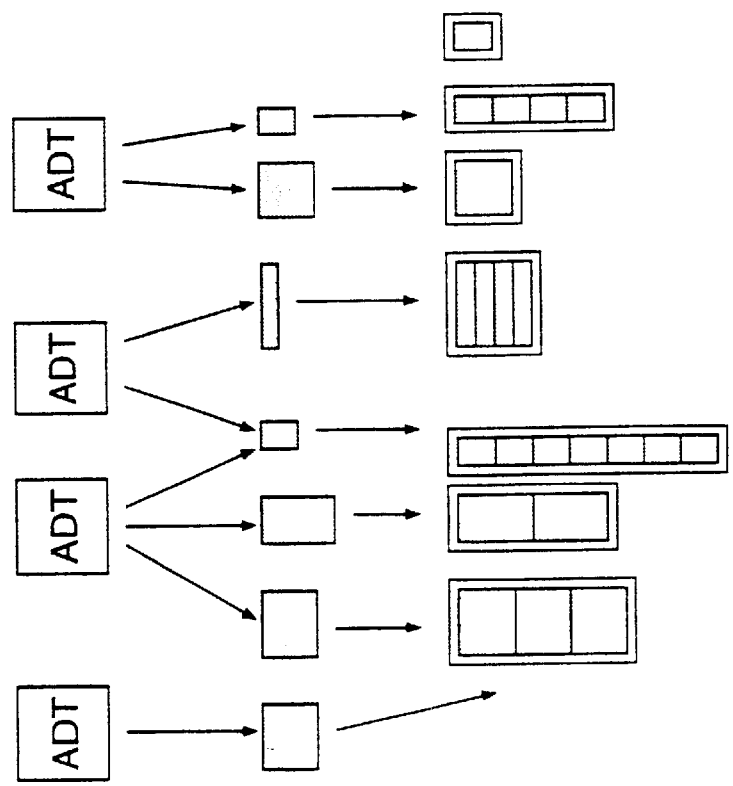

FIG. 1 gives an overview of the dynamic memory management (DMM) design flow into which the present invention fits. At the highest level, the application is specified in terms of abstract data types (ADTs). The ADT refinement step (S. Wuytack, F. Catthoor, H. De Man, "*Transforming Set Data Types to Power Optimal Data Structures*", IEEE Transactions on Computer-aided Design, Vol.CAD-15, No.6, pp.619–629, June 1996.) refines these ADTs into concrete data types. These usually consist of a combination of instantiations of concrete data types.

Next, the Virtual Memory Management (VMM) step defines a number of virtual memory segments (VMSes) and their corresponding custom memory managers. Each VMS consists of a reserved amount of memory to store all instances of one or more concrete data types. To this end, the VMS is divided into a number of blocks, each capable of storing a single instance of the data type. The VMM step determines, via analysis or simulation of a number of scenarios, the amount of blocks that is required to store all instances of that data type. If instances of the data type have to be dynamically created and destroyed, the VMM step also determines a custom memory manager for that VMS. Its task is to return a handle to a free block in the VMS when requested during creation of an instance (allocation), and to mark a block as free again after destruction of an instance (recycling). The ADT and VMM refinement are combined in the DMM stage.

During the subsequent Physical Memory Management (PMM) stage (P. Slock, et al., "*Fast and Extensive System-Level Memory Exploration for ATM Applications*", Proceedings $10^{th}$ ACM/IEEE International Symposium on System-Level Synthesis, Antwerp, Belgium, September 1997.) the VMSes will be assigned to a number of allocated memories. This stage determines the size of the memories in terms of bit width and word depth as well as the number and type (read, write, or read/write) of ports on each memory. The final result is a custom memory architecture, heavily optimized for power and/or area, for the given application. The present invention relates to the VMM refinement step.

VMM consists of two tasks: allocation and recycling. Allocation is the mechanism that searches the pool of free blocks and returns a free block large enough in order to satisfy a request of a given application. Recycling is the mechanism that returns a block which is not used anymore to the pool of free blocks enabling its reuse. The application may free blocks in any order, creating holes (free blocks) among alive blocks. If these holes are small and numerous they cannot be used to satisfy future requests for larger blocks. This problem is known as fragmentation. Fragmentation is divided into two categories: external and internal. External fragmentation happens when the total memory space is available to satisfy a request, but it is not contiguous. Internal fragmentation happens when the free block chosen to satisfy a request is slightly larger than the necessary one, resulting in a segment of memory internal to a block not being used. Allocation mechanisms make use of splitting and merging of free blocks to keep memory fragmentation under control.

Detailed Description of the Search Space

The present invention focuses on design of Virtual Memory Management such that the execution of an application exploiting said Virtual Memory Management on a digital system results in low power consumption of said digital system and that the memory needed in said digital system is also kept small. The cost criterion which may be used for evaluation is thus a combined power consumption and memory size criterion. The design is based on the exploration of different VMM mechanisms. The present invention provides a systematic exploration by identifying orthogonal decision trees in the available search space from which all VMM schemes can then be derived by combination. Based on the search space a methodology (manually or automatically steered) that chooses the best VMM mechanisms for a given application can be derived.

Figure 2:
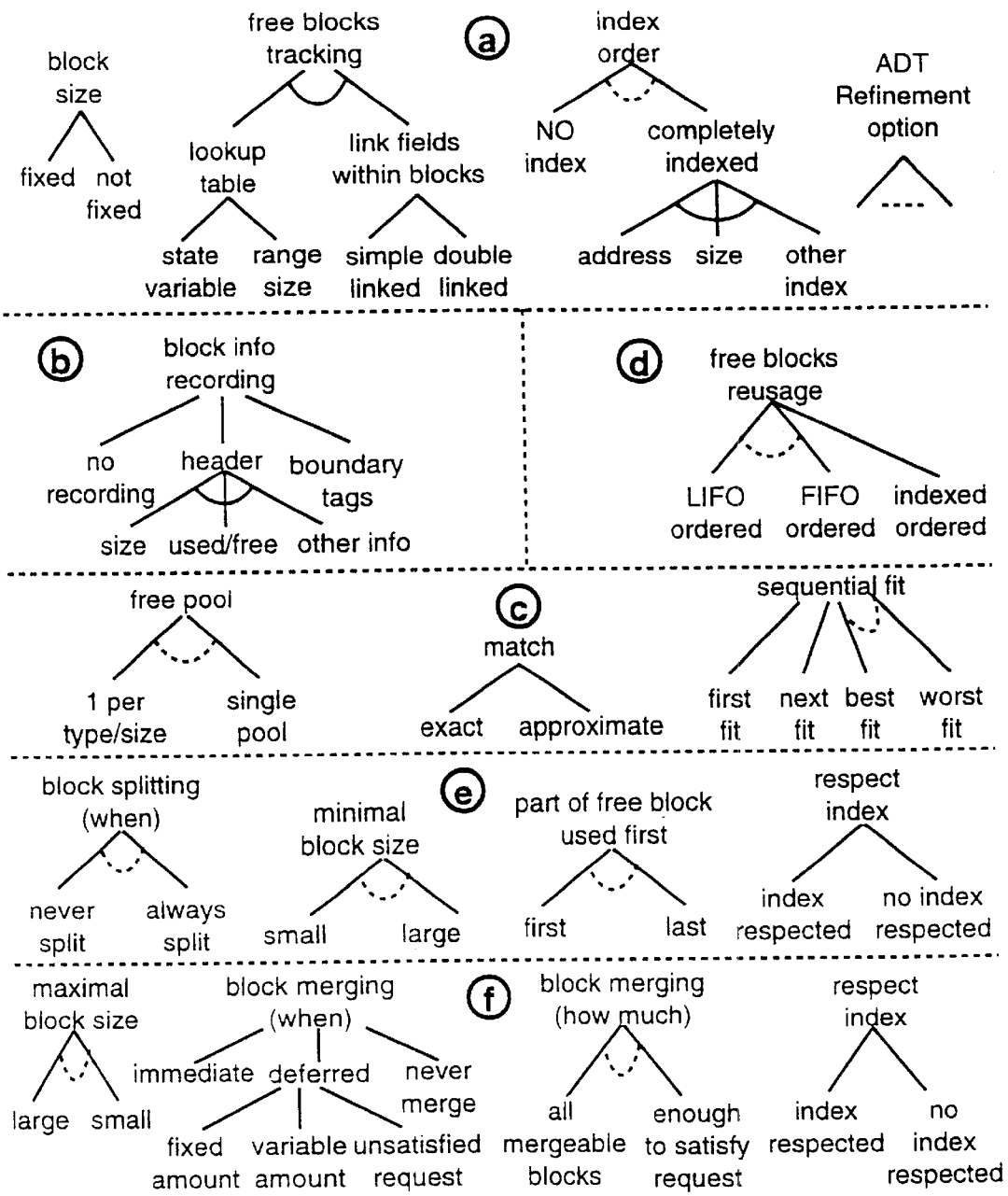
FIG. 2 gives an overview of the disjunct decision trees for Virtual memory management mechanisms

In the search space according to the present invention (see FIG. 2) any combination of a leaf from each of the decision trees represents a valid VMM mechanism. Note that implicit recycling mechanisms, known as garbage collectors, are not considered in the search space. With valid VMM is meant a VMM mechanism which can be realized practically. A solid arc between two or more choices represents that all possible combinations between these branches of the decision tree are feasible. A dashed arc between two choices represents a set of possibilities that can vary from one extreme to another in the decision tree over an enumerated axis. These dashed and solid arcs are denoted marks.

This search space representation is an embodiment of the present invention. In summary it can be stated that, according to this embodiment, all virtual memory management design choices are represented in a set of disjunct trees, each of said trees representing a design choice, the leaves of a tree representing the design options of the corresponding design choice, such that a combination of said leaves from said disjunct trees, one said leaf from one said disjunct tree, defines a valid virtual memory management scheme.

In a further embodiment of the present invention the set of disjunct trees comprises a tree, representing how the virtual memory is organized; a tree, representing the fit policy; a tree, representing the match policy; a tree, representing the block size of free blocks; a tree, representing free block tracking policy; a tree, representing the index ordering policy; a tree, representing the freeing used blocks policy; a tree, representing the block splitting policy; a tree, representing the block size used in the splitting policy; a tree, representing the part of the free block used first in the splitting policy; a tree, representing the index ordering used in the splitting policy; a tree, representing the block merging policy; a tree, representing the block size used in the merging policy; a tree, representing the amount of merging to be done; a tree, representing the index ordering used in the merging policy; and a tree, representing the recording policy. The present invention also includes that any of these trees may also be a zero or empty tree, i.e. containing no choices and not contributing to the final scheme.

This definition of the search space enables according to the present invention classification of several classical allocation mechanisms, such as, ordered binary trees (T. Standish, "*Data Structure Techniques*", Addison-Wesley, Reading, Mass., 1980.) segregated lists (P. Purdom, et al., "*Statistical investigation of three storage allocation algorithms*", BIT, Vol.11, pp.187–195, November 1971.) and buddy systems (J. Peterson, T. Norman, "*Buddy Systems*", Communications of the ACM, Vol.20, pp.421–431, June 1977.). In the following these decision trees for allocation and recycling mechanisms are presented.

In general the structure of each of said disjunct decision trees is proposed. Said trees are organized hierarchically and thus comprise several branches, subbranches and leaves. Leaves are the lowest elements of said trees in said hierarchical ordering. Marks indicate whether intermediate design choices between the design choices, representing by leaves or branches are possible. Said marks can be a dashed or solid arc.

The possibilities for keeping track of free blocks are depicted in FIG. 2a. Free blocks may have fixed allowable sizes (such as powers of two in (D. Knuth, "*The Art of Computer Programming, volume 1: Fundamental Algorithms*", Addison-Wesley, Reading, Mass., 1973.)) or not. The allocation mechanism keeps track of free blocks using either link fields within free blocks or lookup tables. Lookup tables may use state variables indicating free or used blocks (H. Boehm, M. Weiser, "*Garbage collection in an uncooperative environment*", Software Practice and Experience, Vol.18, pp.807–820, September 1988.) or tables containing ranges of sizes (P. Purdom, et al., "*Statistical investigation of three storage allocation algorithms*", BIT, Vol.11, pp.187–195, November 1971.). The free blocks may be indexed by size, or address, or both (C. Stephenson, "*Fast fits: New methods for dynamic storage allocation*", Proc. 9th Symposium on Operating Systems Principles, pp.30–32, October 1983.) etc. The decision trees for ADT refinement are described in (S. Wuytack, F. Catthoor, H. De Man, "*Transforming Set Data Types to Power Optimal Data Structures*", IEEE Transactions on Computer-aided Design, Vol.CAD-15, No.6, pp.619–629, June 1996.). Free blocks may be organized in data types such as: linked lists, trees, pointer arrays or arrays. Using link fields within free blocks avoids overhead in terms of memory usage as long as a minimum block size is respected. On the other hand, lookup tables always incur an overhead in terms of memory usage. Individual embodiments of the present invention Include: The tree, representing the block size of free blocks, comprises a first leaf, representing that said block size of free blocks is fixed; and a second leaf, representing that said block size of free blocks is free. The tree, representing the free block tracking policy, comprises a first branch, representing the use of lookup tables and a second branch, representing the use of link fields, said branches are connected by a mark, said first branch comprises a first leaf, representing the use of state variables, and a second leaf, representing the use of tables, said second branch comprises a first leaf, representing a simple linked approach, and a second leaf, representing a double linked approach. The tree, representing the index ordering policy, comprises a first leaf, representing that no index is used, and a branch, representing completely indexing, said first leaf and branch are connected by a mark; said branch, comprises a first leaf, representing address indexing, a second leaf, representing size indexing and a third leaf, representing other indexing approach, said leaves are connected by a mark.

The possibilities for recording information about the block are depicted in FIG. 2b. A block may optionally contain information about itself, such as size and/or whether it is used or free, and/or information about relationship with neighbors, and/or any other useful information. Recording information about the block implies an overhead in terms of memory usage. The smaller the block size allocated, the more significant the overhead is. However, it is useful to record information about the block when implementing policies for block merging and splitting. For instance, boundary tags are used for general merging of free blocks. They consist of a header and a footer, both of which record the block size and if the block is in use or free. When a block is freed the footer of the preceding block of memory is examined. Adjacent free areas may then be merged to form larger free blocks. An individual embodiment of the present invention includes: the tree, representing the recording policy, comprises a first leaf, representing no recording, a branch, representing recording via a header and a second leaf, representing recording via boundary tags, said branch, comprises a first leaf, representing that the block size is recorded, a second leaf, representing that whether the block is free or not is recorded and a third leaf, representing that other information is recorded.

The possibilities for choosing a block from the free block pool, in order to satisfy a given request, are depicted in FIG. 2c. Free blocks may be either in a single pool for all blocks or grouped in sectors (P. Purdom, et al., "*Statistical investigation of three storage allocation algorithms*", BIT, Vol.11, pp. 187–195, November 1971.). These sectors may group blocks per size or type. The sectors may use either an exact match policy, in which a sector groups blocks of a specific size, or an approximate match policy, in which a sector group blocks of a set of sizes. In a sequential way the allocation mechanism tries to satisfy a given request by finding either the first free block large enough (first fit) or the best match fit (best fit). A variation of first fit (next fit) (D. Knuth, "*The Art of Computer Programming, volume* 1: *Fundamental Algorithms*", Addison-Wesley, Reading, Mass., 1973.) keeps a pointer to the free block after the previous allocated block. This pointer, is used as a starting point for searching the next free block. Opposed to best fit there is a policy known as worst fit. When sizes or types to be allocated are known at compile time, keeping different sectors per size improves allocation speed and eliminates internal fragmentation, but it may increase external fragmentation because blocks of one sector can not be reused in another sector. So a trade off is involved.

Individual embodiments of the present invention include: a tree, representing how the virtual memory is organized, comprising of a first leaf, representing that for each datatype another pool is used, and a second leaf, representing that all datatypes are in one pool, said leaves are connected by a mark. A tree, representing the match policy, comprising of a first leaf, representing an exact match policy, and a second leaf, representing an approximate match policy. A tree, representing a fit policy, comprising of a first leaf, representing a first fit policy, a second leaf, representing a next fit policy, a third leaf, representing a best fit policy and a fourth leaf, representing a worst fit policy, said third and fourth leaf are connected by a mark.

The possibilities for returning a recently freed block to the pool of free blocks are depicted in FIG. 2d. The indexed ordered option (C. Stephenson, "*Fast fits: New methods for dynamic storage allocation*", Proc. 9th Symposium on Operating Systems Principles, pp.30–32, October 1983.) is usually slower than the FIFO and LIFO (C. Weinstock, "*Dynamic Storage Allocation Techniques*", PhD. Thesis, Carnegie-Mellon University, Pittsburgh, April 1976.) ordered options. It returns a block to the pool of free blocks respecting an index order instead of simply returning it to the top or bottom of the pool. However, it may avoid wasted memory when combined with merging and splitting techniques. The performance of an indexed ordered scheme may be improved by using hashing, but it does not work well for all ADT choices. There is a clear trade off between speed and area in this choice.

Individual embodiments of the present invention include: A tree, representing the freeing used blocks policy, comprising of a first leaf, representing a LIFO ordering approach, a second leaf, representing a FIFO ordering approach, a third leaf, representing an indexed ordering approach, said first and second leaf are connected by a mark.

When the free block chosen to satisfy a request is larger than the necessary one, a policy for splitting the block being allocated is preferably implemented. The possibilities for splitting are depicted in FIG. 2e. The splitting of a block may be done: never, sometimes or always. The splitting may be done only if the block has a minimum size (D. Knuth, "*The Art of Computer Programming, volume* 1: *Fundamental Algorithms*", Addison-Wesley, Reading, Mass., 1973.). Which part of the free block is used first should be chosen. The splitting may have to respect some index, such as size. The remainder of the split returns to the pool of free blocks obeying a decision tree equivalent to the one presented earlier.

Individual embodiments of the present invention include: a tree, representing the block splitting policy, comprising of: a first leaf, representing an approach that never splits, a second leaf, representing an approach, which always splits, said leaves are connected by a mark. A tree, representing the block size used in the splitting policy, comprising of: a first leaf, representing small block sizes, a second leaf, representing large block sizes, said leaves are connected by a mark. A tree, representing the part of the free block used in the splitting policy, comprising of: a first leaf, representing that the first part of the block is used, a second leaf, representing that the last part of the block is used, and said leaves are connected by a mark. A tree, representing the index ordering used in the splitting policy, comprising of: a first leaf, representing that the index ordering is respected; and a second leaf, representing that no index is respected.

When adjacent blocks are free they may be merged following one of the possibilities depicted in FIG. 2f. For instance, for already large blocks it may be uninteresting to merge them, because the result will be an even larger block for which a suitable allocation request may never be issued. In general it is interesting to defer the merging in order to avoid subsequent splitting operations. Deferred merging (B. Margolin, et al., "*Analysis of free-storage algorithms*", IBM Systems Journal, Vol.10, pp.283–304, April 1971.) may be implemented in different ways: wait for a fixed or variable amount of allocation requests before merging or wait for an unsatisfied allocation request before merging. The amount of blocks to be merged should be chosen from merging all mergeable blocks to merging only enough blocks to satisfy the last request. When the free blocks are kept in an indexed ordered way, the merging mechanism must also respect the index used.

Individual embodiments of the present invention include: a tree, representing the block merging policy, comprising of: a first leaf, representing immediate block merging, a second leaf, representing never merging, and a branch, representing deferred merging, said branch, comprising of a second leaf, representing waiting for a fixed amount of requests, a third representing waiting for a variable amount of requests, and a fourth leaf, representing waiting for an unsatisfied request. A tree, representing the block size used in the merging policy, comprising of: a first leaf, representing a large block size, a second leaf, representing a small block size; and said leaves are connected with a mark. A tree, representing the amount of merging to be done, comprising of a first leaf, representing that all mergeable blocks are merged, a second leaf, representing that enough merging is done to satisfy a request, and said leaves are connected with a mark. A tree, representing the index ordering used in the merging policy, comprising of: a first leaf, representing that the index is respected, a second leaf, representing that no index is respected.

A set of orthogonal decisions that are preferably taken when implementing a VMM mechanism are identified. The decisions that should be taken in these trees are not totally independent however. A decision taken in one tree may affect the cost characteristics of other decision trees. A systematic exploration methodology consists of: identifying how much each decision influences a given parameter (resulting in an ordering of the decisions), identifying the (intrinsic) dependencies among the decisions (also reflected in this ordering), and making proper use of the knowledge about the applications.

In the present invention the following strategy may be used: given a parameter (e.g. maximal power, average power or area) to be minimized and given design constraints (e.g. timing), the decisions are preferably taken starting with the ones that have a major influence on the chosen parameter, but also taking into account the effects on other trees.

In embedded implementations advantage of any information available at compile time is preferably taken. Taking into account the knowledge of the applications that are using the VMM mechanisms to be implemented allows to prune heavily the search space. This knowledge allows finding a power efficient VMM mechanism while avoiding unallowable memory overhead and fragmentation. Three important factors help in guiding the choices in the decision trees previously described: the knowledge about all possible types or sizes used in the application, the knowledge about the maximum amount of instances of each type requested by the application, and the maximum total amount of data alive at any time.

In a memory oriented power model, the access count (number of accesses to memory) has the major (linear) influence on power, because the memory size only has (strongly) sublinear effect (K. Itoh, et al., "Trends in low-power RAM circuit technologies", special issue on "Low power electronics" of the Proceedings of the IEEE, Vol.83, No.4, pp.524–543, April 1995.). For a given record the access count is the sum of the number of accesses during its allocation plus the accesses during its lifetime plus the ones during deallocation. Hence, when the worst case number of accesses during allocation and deallocation of a block is dominant over the number of accesses during its lifetime, the corresponding datatype is denoted access count dominated.

However, for other applications, the number of accesses to some VMSes during its lifetime may be dominant over the number of accesses during allocation and deallocation. Such datatypes are denoted size dominated. In this case it does make sense to try to minimize memory size which still influences power in a less direct way. Also other parameters such as area overhead in logic, code size or complexity may be taken into account.

Figure 3:
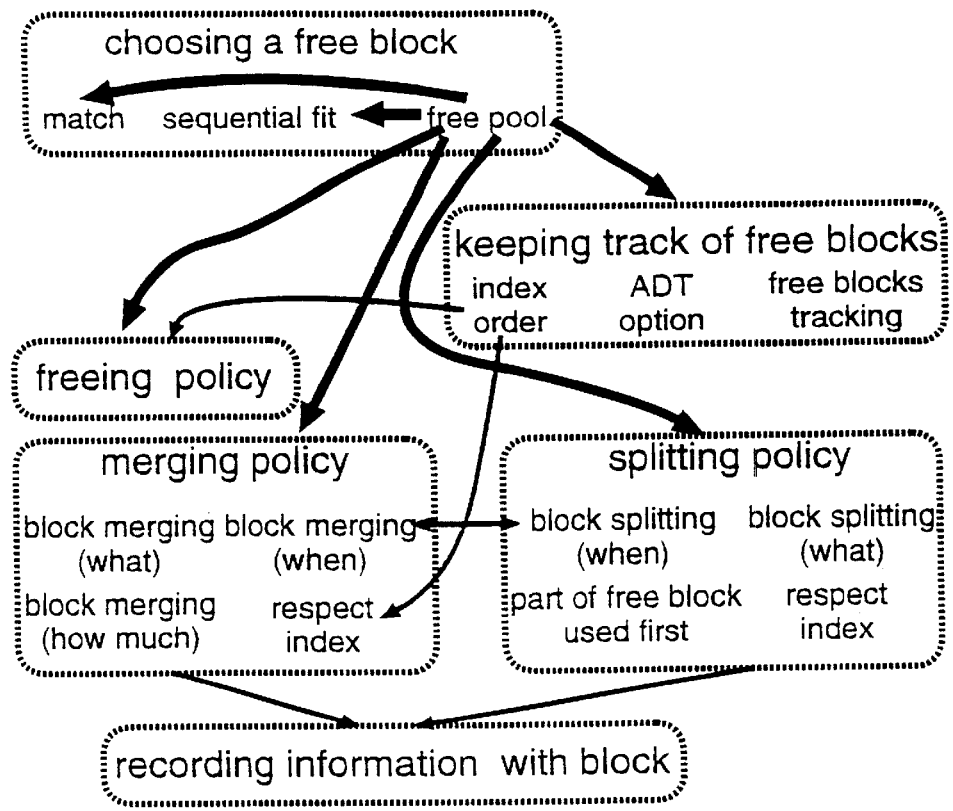
FIG. 3 illustrates the dependencies among decision trees.

A design methodology according to the present invention is now presented. In FIG. 3. The arrows show which are the most significant inter-dependencies among the decision trees in the VMM search space. This results in a specific ordering of the design decisions. The most important decision tree involves choosing between using one sector per type or using an entire pool for all types since this has a global effect. It affects all data types and all the other decisions. Next, the choice about the use of an index to order the free blocks and the merging/splitting choices have also an impact in several trees. However, this impact is now per data type or set of data types that are grouped together, according to the first decision. All other choices are done for each sector independently. The second decision that has influence on several other decision trees is about the use of an index ordering. The third decision to be taken relates to the splitting and merging policy. Naturally decisions in the related trees must be compliant.

Apart from these major inter-dependencies, the other decisions are independent in terms of influence on the number of accesses. Thus choosing in each decision tree the leaf that minimizes the number of accesses locally is possible.

The present invention relates to cost effective virtual memory management design for embedded hardware/software processors and data-dominated applications with dynamic data types. The cost criterion comprises essentially of (1) the power consumed by the embedded hardware/software processor while executing said application and (2) the overall (memory) size of said hardware/software processor. Said hardware/software processor will further also be denoted (digital) device.

As input for the design (concrete) data-types needed by the application are given. The outcome of the design are a number of virtual memory segments and their corresponding memory managers. A virtual memory segment comprises a group of datatypes. For each of said group of datatypes a virtual memory manager must be designed. It must be emphasized that thus two major steps can be indicated: (1) deciding on the grouping of said datatypes and (2) designing virtual memory managers for each said group.

Virtual memory management schemes in general deal with the allocating of a memory block (in which data types can be stored) for an application request and recycling the memory block when it is not used anymore by the application. The virtual memory management tries to avoid (external and internal) fragmentation of the memory. Note that the virtual memory management defines an interface between the application and the physical memory of the processor.

Before cost effective design of the virtual memory management (both grouping of datatypes and virtual memory manager design) can be performed, a clear insight in the distinct design choices must be available. In the present invention the search space is organized as a limited set of decision trees. Selecting from each of said trees a leaf and combining the selected leaves results always in a valid virtual memory management scheme. When design choices which are intermediate the design choices indicated by the leaves are possible, this is explicitly indicated by a mark. As such the set of decision trees with their leaves and marks describes the complete search space by presenting all independent (orthogonal) design choices.

The actual choices to be made by a designer can be guided by (1) using compile-time information (e.g. worst case size of data types), (2) profiling information (e.g. access counts and size of data types) and (3) estimates of the needed memory size and power consumption. Said profiling information is obtained by performing simulations, using input sequences for said application. Said estimation of the needed memory size and power consumption are essentially depending on said profiling information.

Note that the results of said simulations (the profiling information) can depend heavily on the virtual memory management construction used and that said virtual memory management is just under construction here. Therefore, the design methodology requires a simulation environment in which a application can be simulated using a selected virtual memory organization (defining virtual memory segments by deciding which data types are in which pool) and select for all pools virtual memory managers. From these simulations profiling information of the application under study is extracted. In these simulations real data (input sequences representative for the data that will be used by the application when it is fully realized) is used. These simulations are also called experiments.

An embodiment of the present invention is to present a methodology for optimal design of a virtual memory management, based on exploration of a structured (orthogonal) complete search space of virtual memory organization and management schemes. A further embodiment of the present invention is to present said structured (orthogonal) complete search space of virtual memory organization and management schemes as a list of disjunct trees, each representing a design choice.

The decision to be made by the designer can be guided either by experiments or can be a standard solution. Note that it is the designers choice to determine how to decide. The designer can also decide not to perform an experiment at all.

A further embodiment of the present invention is to present a methodology for optimal design of a virtual memory management, based on exploration of a structured (orthogonal) complete search space of virtual memory organization and management schemes, in a way that the decision to be made is based either on experiments or a standard solution and the designer determines how to decide.

As indicated above design decisions made can be based on the profiling information found with the experiments, based on simulations. Simulations are is in principle only possible when for all design choices a particular choice is made and as such a virtual memory management is determined. But it is these design choices are also under investigation. In the present invention this chicken-and-egg problem is solved as follows. A distinction between the leaf of the tree under consideration and the other leaves is made. Experiments are defined as simulations for which a variety of virtual memory management schemes are used, whereby only said leaf of the tree under consideration is varied. The other leaves, necessary for defining a virtual memory management are fixed. When such a leaf is part of a tree for which already an optimal leaf is determined, naturally said leaf is said optimal leaf. When such a leaf is part of a tree for which not yet an optimal leaf is determined, a default leaf is used. Naturally experimenting is only possibly when a suitable simulation environment is available.

A further embodiment of the present invention is to present a methodology for optimal design of a virtual memory management, based on exploration of a structured (orthogonal) complete search space of virtual memory organization and management schemes, whereby the experiments are performed in a particular way.

It must be emphasized that the experimentation method presented above fits into a step-by-step approach of the virtual memory management design. Moreover, the experimentation method heavily relies on the assumption that choices fixed at a previous step must not be reconsidered while proceeding through the step-by-step method. This is an important feature of the tree ordering, presented in the present invention further on.

The most important decision in the design of virtual memory management (for dynamic data-type applications) is choosing between one sector (virtual memory segment) per data type or using an entire pool (virtual memory segment) for all types or some intermediate solution. This has severe influences on the other choices influencing the exploration parameter power. The organization of the virtual memory is thus the first decision which must be made. Organizing the virtual memory means deciding on the grouping of datatypes in groups. For each group a virtual memory segment is defined. For each segment a virtual memory manager must be constructed.

A further embodiment of the present invention is to present a methodology for optimal design of a virtual memory management, based on exploration of a structured (orthogonal) complete search space of virtual memory organization and management schemes, in a step-by-step manner, whereby in a first step a decision on the organization of the virtual memory is made.

In general, power consumption models are linear in access count and sublinear in memory size. As power consumption is one of the parts of the cost criterion under consideration, the characteristics of the power consumption model influences the virtual memory management design. Indeed in the present invention a major distinction between access dominated and size dominated data types is made. Note that data types based on information (compile-time or profiling information obtained from experiments) are labeled to be either access dominated or size dominated. In the present invention based on said classification a particular way of grouping is proposed as a standard solution.

A further embodiment of the present invention is to present the structure of the tree, representing the design choice, related to grouping of datatypes. A further embodiment of the present invention is deciding for each grouping of datatypes which type of index ordering will be used as a second step in virtual memory management design. A further embodiment of the present invention is to present the structure of the tree, representing the design choices, related to index ordering.

A third step in virtual memory management design is to decide for each grouping of datatypes which type of merging and splitting policy is made. A further embodiment of the present invention is that in the methodology for optimal design of a virtual memory management, the decision about merging and splitting for each group of datatypes is recognized as the third decision to be taken.

A best design (with respect to the criterion power) for access count dominated datatypes is provided. Note that this is no way means that no exploration need to be performed as the designer preferably takes into account other criteria such as area.

Figure 6:
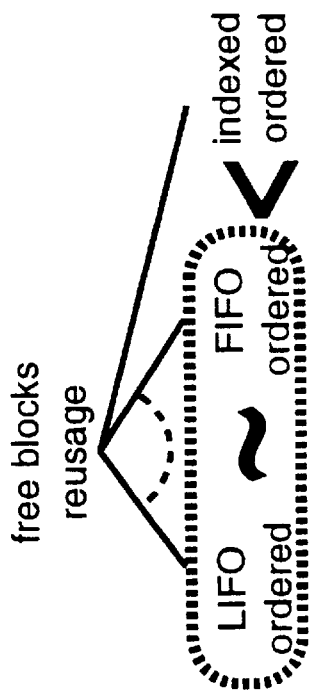
FIG. 6 shows the local influence on NA (number of access) by freeing used blocks.
Figure 7:
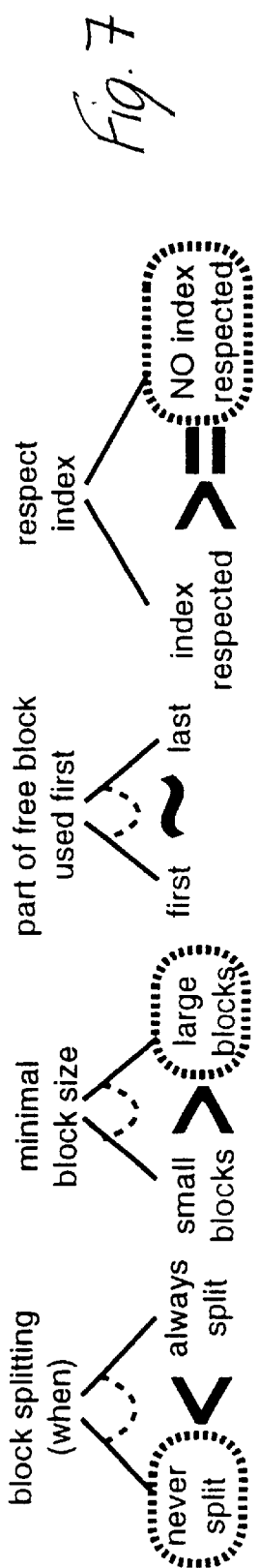
FIG. 7 shows the local influence on NA (number of access) by splitting blocks.

Next, for each decision tree the local effect on power by comparing the impact of each leaf of these trees on the worst case number of accesses (NA) is discussed. The NA is always the same for all leaves in the decision tree that concerns recording information about the block (FIG. 6b). In the accompanying figures each best local choice surrounded by a dashed line are indicated.

Figure 4:
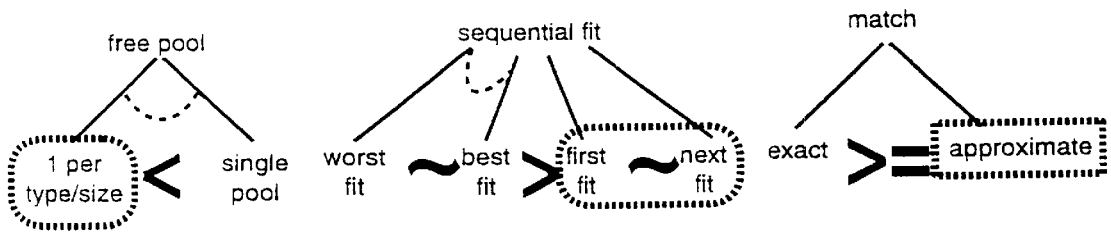
FIG. 4 shows the local influence on NA (number of access) by choosing a free block.
Figure 5:
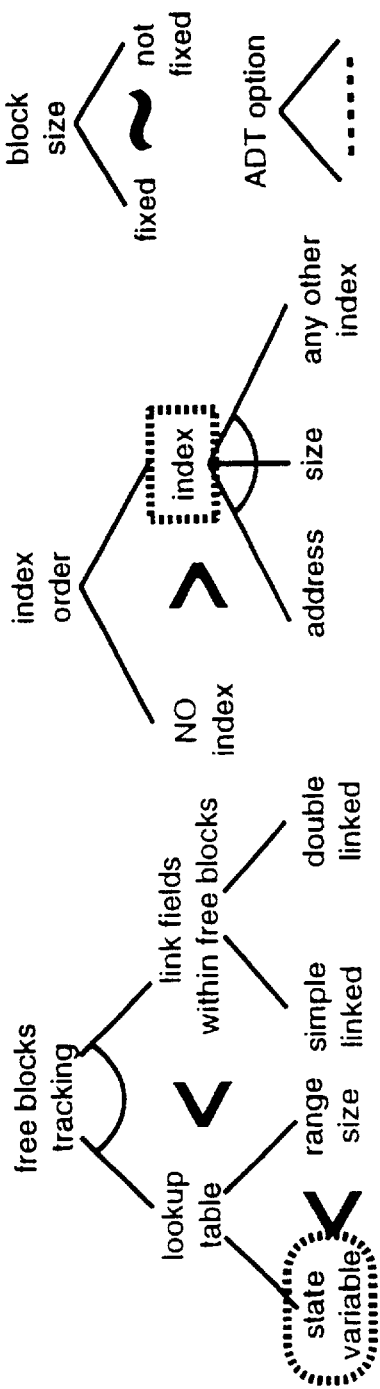
FIG. 5 shows the local influence on NA (number of access) by keeping track of free blocks.

1. NA is smaller when having one sector per type or size instead of one entire pool for all blocks. Sequential fits do not scale well and depending on the size of the pool of free blocks they are unusable due to the high NA necessary for allocation. Having one sector per type or size decreases the scalability problems inherent to sequential fit policies. (FIG. 4)
2. NA is usually the same for next fit and first fit policies and both are usually smaller than best fit. This is due to the behavior of the best fit policy that not only requires a block large enough for satisfying a request but also the best fit for the given request. (FIG. 4)
3. NA for an approximate match is smaller than finding an exact match. (FIG. 4)
4. NA is usually the same for fixed or not fixed allowable sizes.(FIG. 5)
5. NA for tracking blocks with lookup tables is smaller than using link field within free blocks. Using a state variable scheme requires fewer accesses than range size scheme. (FIG. 5)
6. NA for indexed ordered structures is usually smaller than for non-indexed ordered ones. (FIG. 5)
7. NA for different ADTs choices varies according to 24 (FIG. 5)

Figure 8:
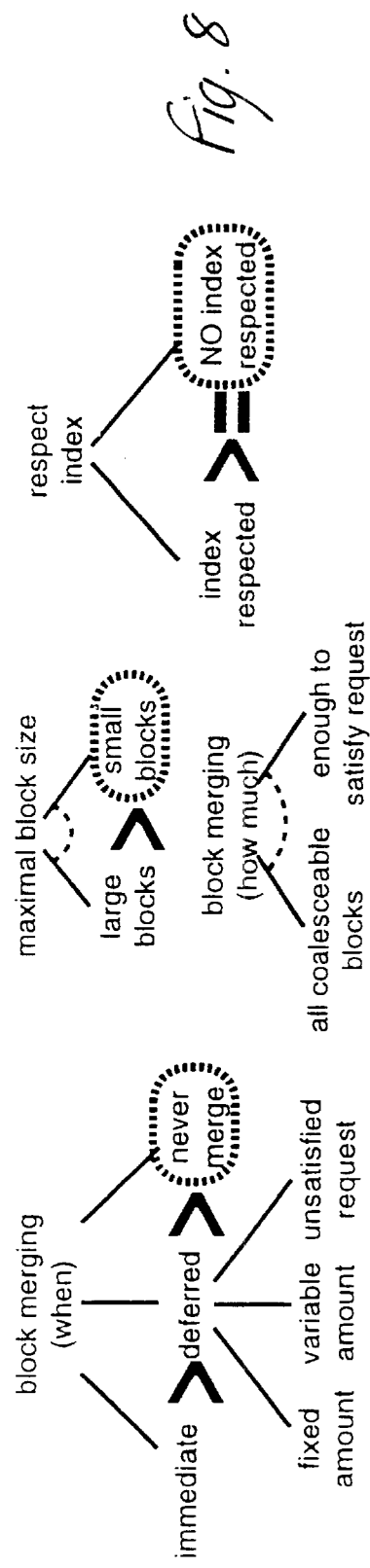
FIG. 8 shows the local influence on NA (number of access) by merging free blocks.

8. NA for FIFO and LIFO ordered is the same. However, when an index ordered is used, returning free blocks must obey this index and a larger NA is necessary to find out the right location to return the free block. (FIG. 6)
9. NA is smaller when splitting is not used (it may be harder to find desired block). (FIG. 6)
10. NA is smaller when a minimum block size for splitting is imposed instead of splitting already small blocks. (FIG. 6)
11. NA is the same for using the last or first part of a free block. (FIG. 6)
12. NA is larger when the splitting of free blocks must respect some index because after splitting the remainder must be placed in the indexed structure in the right position. (FIG. 6)
13. NA is smaller when merging is not used (it may be harder to find the desired block). Immediate merging requires a larger NA than deferred merging. (FIG. 8)
14. NA is smaller when a maximum block size for merging is imposed instead of merging already large blocks. (FIG. 8)
5. NA concerning the amount of blocks to be merged (all or enough to satisfy request) depends on the application behavior. (FIG. 8)
16. NA is larger when the merging of free blocks must respect some index because after the merging the block must be placed in the indexed structure in the right position. (FIG. 8)

To conclude a standard leaf selection for access count dominated datatypes for the two first decisions to be taken in the design method are stated explicitly below. A further embodiment of the present invention is that it is proposed to place each access count dominated data type in a separate group (pool, sector, virtual memory segment) and to group all size dominated data types in one group (pool, sector, virtual memory segment). A further embodiment of the present invention is that it is proposed for access count dominated data types to use index ordering.

In an embodiment of the present invention optimal design of VMM is based on choosing parameters of a parametrizable virtual memory management model. In order to minimize memory size, a VMM mechanism, including the selected virtual memory management organization, should try to reuse memory for different data types and at the same time keep overhead and fragmentation as low as possible. This normally implies the need of more sophisticated VMM mechanisms which are also more expensive in terms of memory accesses needed for allocation/deallocation. The question to be answered is: Which mechanism allows us to reuse memory for different data types increasing as little as possible the number of accesses during allocation/deallocation? Instead of exploring the full design space, defining a parametrizable virtual memory manager model and tuning the parameters of this model for the application under consideration is another approach for designing a cost effective virtual memory management. As such a limited search space, spanned by the parameters, is defined. Naturally the model is preferably chosen such that the cost optimization is still feasible.

In summary it can be stated that the following optimal virtual memory management design method is disclosed: a method for designing an optimal virtual memory management for an application, comprising the steps of:
loading said application in a simulation environment, enabling performing of experiments for said application combined with a virtual memory management;
defining a virtual memory management model with a set of parameters;
performing experiments using a default virtual memory management; and
selecting said parameters based on said experiments.

In an embodiment of the present invention a virtual memory management model is presented. Quick Lists (B. Margolin, et al., "*Analysis of free-storage algorithms*", IBM Systems Journal, Vol.10, pp.283–304, April 1971.) is a traditional VMM mechanism, well known for providing fast allocation and deallocation and also for keeping fragmentation low. Quick lists differs significantly from the present invention as Quick Lists assumes that the physical memory or memory architecture has already been decided, whereas the present invention is aimed at providing memory management information which allows the physical memory to be selected in an optimal way based on a virtual memory management. The present invention includes a parameterizable model, called Flexible Pools, that enables size exploration minimizing power consumption. Flexible Pools takes into account the knowledge of the application that is using the VMM mechanism to select a number of choices in the defined search space. Moreover, these choices are parameterizable and are tuned according to the application.

Figure 9:
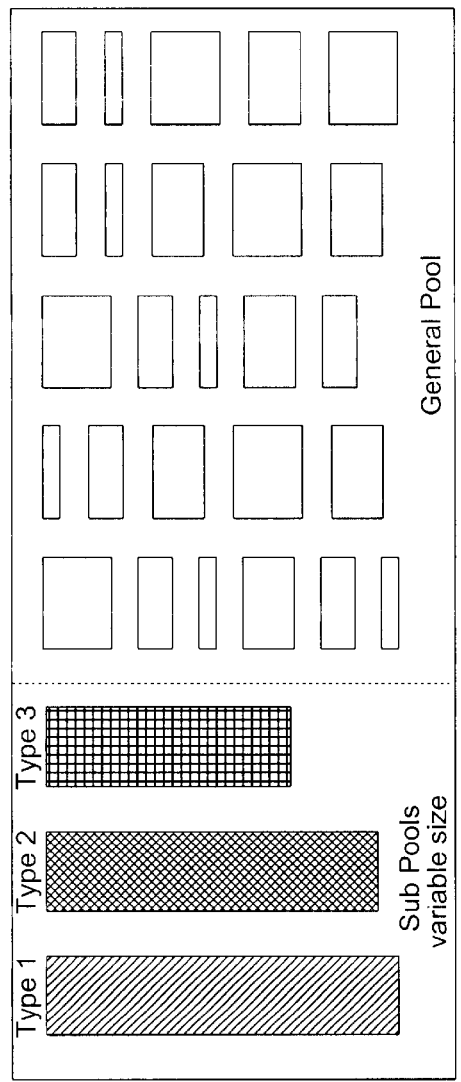
FIG. 9 shows a prior art parametrizable virtual memory model denoted Quick Lists.
Figure 10:
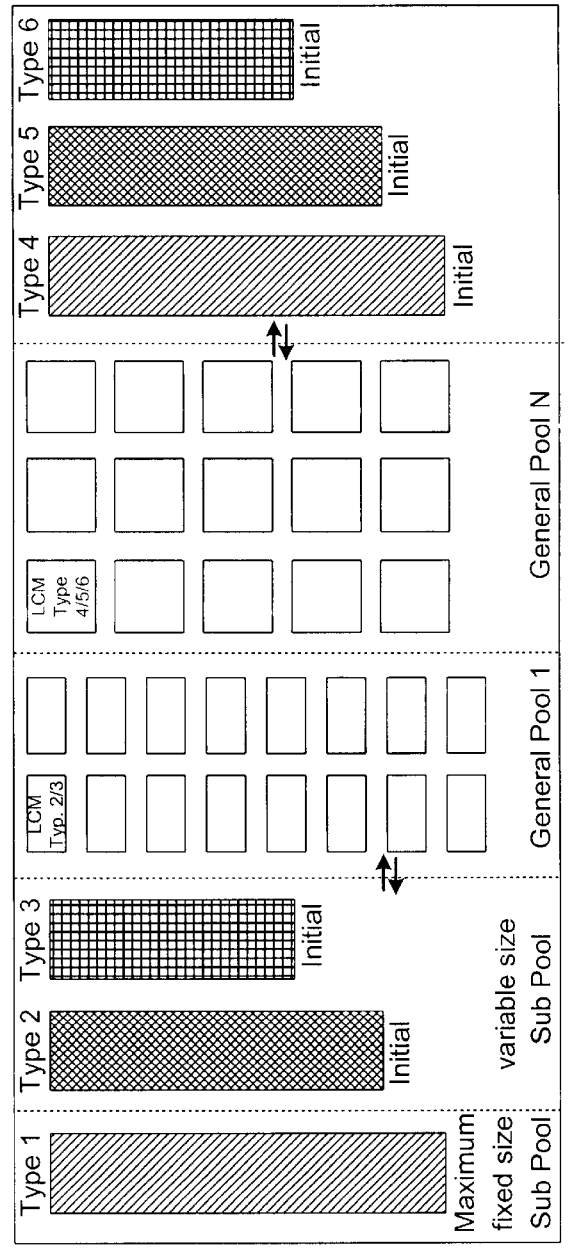
FIG. 10 shows the invented parametrizable virtual memory model denoted flexible Pools.

This model according to the present invention, called Flexible Pools, is a significant extension and parameterization of Quick Lists. Flexible Pools allows the designer to trade-off power and area, matching the requirements of a given application. The similarities and differences between Quick Lists, shown in FIG. 9 and Flexible Pools, shown in FIG. 10, are described further. Also the influence of each characteristic on power and area is discussed.

Free blocks may be organized either in a single pool for all blocks or grouped in sub-pools. Full exploration of all possibilities results in a huge design task. In Quick Lists the virtual memory is organized as one general pool and a number of sub-pools. Fragmentation is made low by using block merging and splitting techniques. In Quick Lists an array of sub-pools is kept, one for each size whose merging should be deferred. The sub-pools act as caches for the location and size information about free blocks for which merging has not been attempted. The general pool allows data types to share the same storage area. Although Quick Lists reduces the exploration space considerable, it is quite limited (possibly overlooking the optimal virtual memory organization) and does not allow pruning towards the application.

In the present invention the following virtual memory organization is proposed. In Flexible Pools the virtual memory is organized as a number of general pools and a number of sub-pools. The sub-pools also act as caches for the general pools. Several different general pools avoid many different block sizes in the general pool and the need of merging and splitting techniques, decreasing the number of accesses during allocation as well as power. However, the data types that share the same general pool are still allowed to share the same storage area. Another difference in the organization of the virtual memory is that in Quick Lists, blocks are connected to each other in a pure list data structure while in Flexible Pools it maybe a list, a binary tree, or a pointer array. These different organization of data types also have an impact on power.

The parametrizable model of the virtual memory organization Flexible Pools limits the exploration space considerably but has due to its flexibility (adaptation to the application under consideration) more chance to include a (nearly) power optimal solution. The number of subpools, denoted pools of a first kind and the number of general pools, denoted pools of a second kind, are parameters of the model.

The flexibility in data structure for connecting blocks is presented as an embodiment of the present invention.

Quick Lists only has a number of sub-pools with a variable number of blocks, which can allocate free blocks from the general pool. Said sub-pools are denoted pools of a first type. In addition to the variable sub-pools, Flexible Pools also has a number of sub-pools with a fixed pre-defined number of blocks. These sub-pools can not allocate free blocks from the general pool. Said pools are denoted pools of a second type. Said number of said pools of a first type and second type are numbers of the virtual memory management model.

The fixed sub-pools are used to store access dominated data types while the variable sub-pools are used to store size dominated data types, hence optimizing the choice of realization more than in Quick Lists. This preferred allocation of datatypes to either one of said types of pools is an embodiment of the present invention.

Quick Lists has a limited number of sub-pools, pre-defined and independent of the application using it. In Flexible Pools the number of sub-pools depends on the application using it. The number of accesses required to allocate a block from the sub-pool is always smaller (and consequently the power consumption is smaller) than allocating a block from the general pool. Hence, power is gained compared to Quick Lists, which has a predefined number of sub-pools.

The initial number of blocks of each sub-pool in Quick Lists is always zero. In Flexible Pools, for each variable sub-pool a minimum initial number of blocks is defined. This initial number of blocks of each sub-pool is obtained from profiling information and based on the minimum number of blocks used in normal operation of the application. Said initial number is also a parameter of said virtual memory management model. This initial sub-pool sizing allows to speed-up allocation during initial allocations compared to Quick Lists.

In Quick Lists the general pool may have blocks of any size. In Flexible Pools, the free blocks in the general pool have a fixed pre-defined size. These sizes are also parameters of said model. By having one size of free blocks in the general pool, merging and splitting can be eliminated, reducing the number of accesses in the general pool. Also the number of accesses for allocation in the general pool is a fixed constant since all the blocks have the same size.

In order to enable the sharing of the general pool, the size of the free block must be at least as large as the largest size of data type that will share the general pool. But this is not enough if area must be saved. If the size of free blocks in the general pool is the Least Common Multiple (LCM) of all sizes of data types sharing the same pool, a free block in the general pool can always be divided in a number of free blocks that match any of the sizes of data types sharing the general pool. In this way there is no wasted memory. On the other hand the LCM may be very big depending on the sizes that are sharing the same pool and often it is useful to waste some bits for rounding up some size of data type in order to have a smaller LCM.

This option basically trades-off some internal fragmentation in exchange of a reduced number of accesses during allocation of blocks. Hence, power is gained compared to Quick Lists.

In Quick Lists only one general pool is used. In Flexible Pools the number of general pools depends on lifetime analysis of data types. Enabling to reuse the same storage for data types with different lifetimes saves area. However, it is only interesting to share the same general pool by a number of data types if those data types have, as much as possible, non overlapping lifetimes, providing in this way area savings. The information about data type lifetimes can be obtained by analysis or profiling.

The size of the general pool will be the size of the maximum number of blocks resulting from the addition of the sizes of all blocks for each data type sharing the same general pool and subtracting the initial size allocated in each sub-pool at any instant in time. The size of said general pools can be expressed also as the maximal amount of blocks in each of said general pools. These numbers are also parameters of the model.

In Quick Lists one free block is allocated at a time from the general pool. In Flexible Pools, the allocation of a new free block, when the sub-pool is empty, may be variable. This means that one or a set of free blocks may be transferred from the general pool to the sub-pool at once. The number of blocks to be allocated from the general pool depends on the rate of the number of allocations per time measured during profiling. By transferring several blocks at a time from the general pool to the sub-pool the number of accesses during allocation is reduced and hence also the power.

In Quick Lists, the free blocks from the sub-pools are "flushed" to the general pool following a given fixed policy. In Flexible Pools returning free blocks from the sub-pool to the general pool is also variable, meaning that returning free blocks can happen less or more often. The numbers of blocks returned to the general pool depends on the average rate of the number of deallocations per time measured during profiling.

The number of blocks transferred vice versa between said sub-pools and said general pools is thus also a parameter of said model.

As a conclusion it can be stated that in the design method based on a parametrizable model, the virtual memory management model, consists of:

pools of a first kind, being said subpools and pools of a second kind, being said general pools;

said pools of a first kind acts as cache for said pools of a second kind;

said pools of a first kind consists of:

pools of a first type with a variable number of blocks;

pools of a second type with a fixed number of blocks; and the number of pools of the first type, the number of pools of the second type, the number of blocks in the pools of the second type, the initial number of blocks in the pools of the first type, the number of pools of a second kind and the size of the blocks in said pools of a second kind are parameters of said virtual memory management model.

Blocks in one pool of whatever type or kind are connected either in a list, a binary tree or a pointer array. Preferably said pools of a second type are used for access count dominated datatypes and said pools of a first type are used for size dominated datatypes. Another parameter of said virtual memory management model is the number of blocks transferred between pools of a first kind and pools of a second kind and vice versa.

Results for two applications are presented which demonstrate the utility of the present invention: SPP (Y.~Therasse, G.~Petit, and M.~Delvaux. "*VLSI architecture of a SDMS/ATM router*", Annales des Telecommunications, 48(3–4), 1993.), an implementation of ATM Adaptation Layer 3/4, and F4 (A. Hemani, et al. "*Design of Operation and Maintance Part of the ATM Protocol*", Journal on Communications, Hungarian Scientific Society for Telecommunications, special issue on ATM networks, 1995.), an operation and maintenance part for the ATM protocol.

SPP

In the SPP, the largest block size is 7 words and the smallest is 2 words. The total memory size is targeted to be 128 Kwords (each word 64 bits) for the main off-chip memory. In FIG. 11, the three data types in the SPP that correspond to the largest amount of data in the main off-chip memory are presented. Also their relative area contribution is shown. Cell stands for ATM cells, IPI stands for Internal Packet Identifier, and RR stands for Routing Record.

In FIG. 12 figures for each data type using three VMM schemes selected from the decision trees are presented. All three schemes use LIFO single linked lists for tracking free blocks.

Scheme 1 uses three different VMSes, one for each data type.

Scheme 2 uses one VMS for all data types.

Scheme 3 uses two different VMSes, one for Cell and another for IPI and RR.

Scheme 2 and 3 use merging/splitting to avoid internal fragmentation since they allow different data types to share the same storage area.

Note that power is given in relative numbers instead of absolute numbers due to the confidentiality of the memory power model being used.

Although only three possible VMM schemes are shown, a large range of power budgets exists and it is crucial to identify a (nearly) optimal solution in the many decision trees.

The methodology in accordance with the present invention does allow to identify these optimal choices by providing design rules.

Cell is an access count dominated data type, while IPI and RR are size dominated data types, concerning number of accesses during lifetime compared to number of accesses during (de)allocation. The power consumed during (de)allocation (VMM) for IPI and RR is much smaller compared to the power consumed during their lifetime (LT). The power consumed during (de)allocation (VMM) for Cell is in the same order of magnitude as the power consumed during its lifetime (LT). This is valid independent of the VMM scheme being used.

In FIG. 13 the relative power consumption of the different VMM schemes are shown. It is observed that Scheme 2 consumes 2.89 times as much power as Scheme 1, while Scheme 3 consumes 1.01 times as much. By using Scheme 3, power increases only 1\% and it allows IPI and RR to share the same memory (obeying exclusion of lifetimes), resulting in a decreased area.

The presented results illustrate the present invention as it demonstrated that the choice to place access count dominated data types and size dominated data types in different VMSes is important while size dominated data types can be grouped.

In the FIG. 14 the power consumption and the area usage of four different VMM schemes normalized to Scheme 1 are shown. The first column corresponds to Quick Lists and the other three correspond to different schemes generated using the invented exploration methodology and the parametrizable model for virtual memory organization. These three schemes use LIFO single linked lists for tracking free blocks.

Scheme 1 uses three different fixed sub-pools, one for each data type.

Scheme 2 uses one VMS for all data types.

Scheme 3 uses two different VMSes, one for Cell and another for IPI and RR.

Scheme 2 and 3 use merging/splitting to avoid internal fragmentation since they allow different data types to share the same storage area.

It can see that Quick Lists and Scheme 2 consumes nearly 3 times as much power as Scheme 1, while Scheme 3 consumes 1.01 times as much. By using Scheme 3, power increases only 1\% and it allows IPI and RR to share the same memory (made the assumption of exclusive lifetimes), resulting in a decreased area. Quick Lists and Scheme 2 are also very good for area, but they are too expensive in terms of power consumption. IPI and RR correspond to 38\% (16+22) of the storage area when using mutual exclusive storage area. This area can be reduced with a minimum power penalty by choosing VMM Scheme 3. The area reduction depends only on the difference between the maximum number of IPIs added to the maximum number of RRs and the maximum number of alive IPIs added to the maximum number of alive RRs. The larger the difference the larger will be the area reduction. The area reduction also depends on the merging/splitting ability of the VMM scheme. Without merging/splitting wasted memory will appear due to internal fragmentation since it would have to use the same block size for both IPI and RR. Using the parametrizable model with LCM free blocks in the general pool there is no internal fragmentation and the number of accesses (and power consumption consequently) during allocation is not increased too much.

These last results illustrate the potential of the Virtual Memory organization using the parametrizable model called Flexible Pools, proposed in the present invention.

Application F4

In the F4 application, only three data types are shown in FIG. 15, which correspond to the largest amount of data. Cell stands for ATM cells, table 1 is used for dynamic process management, and FIG. 12 is used for fault management.

In FIG. 16 figures for each data type using two VMM schemes are shown.

Scheme 1 uses three different VMSes, one for each data type.

Scheme 2 uses one VMS for all data types.

Scheme 2 uses merging/splitting to avoid internal fragmentation since it allows different data types to share the same storage area.

Note that all three data types in the F4 are access count dominated data types. Scheme 2 allows these data types to share the same storage space but it is nearly 10 times worse than Scheme 1 in terms of power consumption.

This application again illustrates one of the important invented design rules. Access count dominated data types should be placed in separate VMSes.

The above methodology can be implemented on a suitable computer such as a workstation. The workstation may be adapted to carry out any of the method steps in accordance with the present invention by providing suitable software to run on the work station. Hence, the present invention also provides a design system for designing an optimal virtual memory management for an application, before the physical memory to be used during execution of the application has been determined, the design system comprising:

a memory store;

a structure in the memory store representing virtual memory management design choices in a set of disjunct trees, each of said trees presenting an orthogonal design choice, the leafs of a tree representing the design options of the corresponding design choice, such that any combination of said leafs from said disjunct trees, said combination comprising of one said leaf from each of said disjunct trees, defines a valid virtual memory management; and a computing device for selecting from all disjunct trees one leaf, thereby defining said optimal virtual memory management.

The design system may include a structure in the memory store of all the virtual memory design choices. The selected management scheme may be output in the form of a printed report or may be displayed on a screen such as a VDU.

It will be apparent to the skilled person that alterations and amendments can be made to the present invention in an obvious manner, the spirit and the scope of the present invention only being limited by the attached claims.

What is claimed is:

1. A method of designing an optimal virtual memory management for an application, before the memory architecture to be used during execution of the application has been determined, comprising:

representing virtual memory management design choices in a set of disjunct trees, each of said trees presenting an orthogonal design choice, the leafs of a tree representing the design options of the corresponding design choice, such that any combination of said leafs from said disjunct trees, said combination comprising of one said leaf from each of said disjunct trees, defines a valid virtual memory management; and selecting one leaf from at least one of the disjunct trees, thereby defining said optimal virtual memory management.

2. The method of claim 1, wherein said set of disjunct trees comprising:

a tree, representing how the virtual memory is organized;
a tree, representing a fit policy;
a tree, representing a match policy;
a tree, representing a block size of free blocks;
a tree, representing a free block tracking policy;
a tree, representing an index ordering policy;
a tree, representing a freeing used blocks policy,
a tree, representing a block splitting policy;
a tree, representing a block size used in the splitting policy;
a tree, representing a part of the free block used first in the splitting policy
a tree, representing an index ordering used in the splitting policy;
a tree, representing a block merging policy;
a tree, representing a block size used in the merging policy;
a tree, representing an amount of merging to be done;
a tree, representing an index ordering used in the merging policy; and
a tree, representing a recording policy.

3. The method of claim 2, wherein selecting one leaf of a tree, is based either on experiments or a pre-determined leaf selection.

4. The method of claim 3, wherein selecting one leaf of a tree, based on experiments further comprises:

loading said application in a simulation environment, enabling performing of experiments for said application combined with a variety of experimental virtual memory managements;

performing experiments whereby all leafs of said tree from which one leaf will be selected are selected once, for all trees of said set of disjunct trees, except said tree from which one leaf will be selected, an optimal leaf is selected when available, otherwise a default leaf is selected, said selected leafs of all said disjunct trees defining an experimental virtual memory management;

calculating the cost criterion for each experiment; and selecting said leaf resulting in the most optimal cost criterion.

5. The method of claim 4, wherein in a first step a leaf is selected from the tree, representing how the virtual memory is organized.

6. The method of claim 5, wherein said tree representing how the virtual memory is organized comprises:

a first leaf, representing a first design choice such that for each datatype of said application another pool is used;

a second leaf, representing a second design choice such that all datatypes of said application are in one pool; and a mark, indicating that each design choice in between said first and second design choice is valid.

7. The method of claim 6, wherein determining the organization of the virtual memory comprises:

grouping all datatypes in one pool;
performing an experiment with a default virtual memory manager for said pool;
indicating for each datatype whether its is access count dominated or size dominated;
defining for each access count dominated datatype a pool; and
defining one pool for all size dominated datatypes.

8. The method of claim 5, wherein in a second step a leaf is selected from the tree, representing the index ordering policy.

9. The method of claim 8, wherein said tree representing the index ordering policy, comprises:

a first leaf, representing a first design choice, such that no index is used; and a second leaf, representing a second design choice, such that an index is used.

10. The method of claim 9, wherein the index ordering policy of the virtual memory manager for an access count dominated datatype uses an index.

11. The method of claim 8, wherein in a third step, leaves are selected from the trees, related to the block merging and block splitting policy, thereby no ordering of said trees, related to merging and splitting must be respected when selecting said leaves.

12. The method of claim 2, wherein said tree, representing the block size of free blocks, comprises:

a first leaf, representing that said block size of free blocks is fixed; and a second leaf, representing that said block size of free blocks is free, and wherein said tree, representing the free block tracking policy, comprises:

a first branch, representing the use of lookup tables; and
a second branch, representing the use of link fields;
wherein said first and second branches are connected by a mark;
wherein said first branch comprises first leaf, representing the use of state variables, and a second leaf, representing the use of tables; and
wherein said second branch comprises first leaf, representing a simple linked approach and a second leaf, representing a double linked approach;

and wherein said tree, representing the index ordering policy, comprises:

a first leaf, representing that no index is used;
a branch, representing completely indexing; and
wherein said first leaf and branch are connected by a mark;
wherein said branch, comprises of a first leaf, representing address indexing, a second leaf, representing size indexing and a third leaf, representing other indexing approach; and wherein said leafs are connected by a mark;

and wherein said tree, representing the recording policy, comprises:

a first leaf, representing no recording;

a branch, representing recording via a header; and a second leaf, representing recording via boundary tags;

wherein said branch, comprises of a first leaf, representing that the block size is recorded, a second leaf, representing that whether the block is free or not is recorded and a third leaf, representing that other information is recorded;

and wherein said tree, representing how the virtual memory is organized, comprises:

a first leaf, representing that for each datatype another pool is used;

a second leaf, representing that all datatypes are in one pool; and wherein said leafs are connected by a mark;

and wherein said tree, representing the match policy, comprises:

a first leaf, representing an exact match policy; and a second leaf, representing an approximate match policy;

and wherein said tree, representing a fit policy, comprises:

a first leaf, representing a first fit policy;

a second leaf, representing a next fit policy;

a third leaf, representing a best fit policy; and a fourth leaf, representing a worst fit policy;

wherein said third and fourth leaf are connected by a mark;

and wherein said tree, representing the freeing used blocks policy, comprises:

a first leaf, representing a LIFO ordering approach;

a second leaf, representing a FIFO ordering approach; and a third leaf, representing an indexed ordering approach;

wherein said first and second leaf are connected by a mark;

and wherein said tree, representing the block splitting policy, comprises:

a first leaf, representing an approach that never splits; and a second leaf, representing an approach, which always splits;

wherein said leafs are connected by a mark;

and wherein said tree, representing the block size used in the splitting policy, comprises:

a first leaf, representing small block sizes; and a second leaf, representing large block sizes;

wherein said leafs are connected by a mark;

and wherein said tree, representing the part of the free block used in the splitting policy, comprises:

a first leaf, representing that the first part of the block is used; and a second leaf, representing that the last part of the block is used;

wherein said leafs are connected by a mark;

and wherein said tree, representing the index ordering used in the splitting policy, comprises:

a first leaf, representing that the index ordering is respected; and a second leaf, representing that no index is respected;

and wherein said tree, representing the block merging policy, comprises:

a first leaf, representing immediate block merging;

a second leaf, representing never merging; and a branch, representing deferred merging;

wherein said branch comprises a second leaf, representing waiting for a fixed amount of requests, a third leaf representing waiting for a variable amount of requests and a fourth leaf, representing waiting for an unsatisfied request;

and wherein said tree, representing the block size used in the merging policy, comprises:

a first leaf, representing a large block size;

a second leaf, representing a small block size; and wherein said leafs are connected with a mark;

and wherein said tree, representing the amount of merging to be done, comprises:

a first leaf, representing that all mergeable blocks are merged; and a second leaf, representing that enough merging is done to satisfy a request;

wherein said leafs are connected with a mark; and and wherein said tree, representing the index ordering used in the merging policy, comprises:

a first leaf, representing that the index is respected; and a second leaf, representing that no index is respected.

13. The method of claim 1, wherein each of said trees is related uniquely to the parameters of a virtual memory management model, said virtual memory management model, comprises:

pools of a first kind and pools of a second kind;

wherein said pools of a first kind acts as cache for said pools of a second kind;

wherein said pools of a first kind comprises:

pools of a first type with a variable number of blocks;

pools of a second type with a fixed number of blocks; and said set of disjunct trees comprises at least:

a tree related to the number of pools of the first type;

a tree related to the number of pools of the second type;

a tree related to the number of blocks in the pools of the second type;

a tree related to the initial number of blocks in the pools of the first type; and a tree related to the number of pools of a second kind and the size of the blocks in said pools of a second kind are parameters of said virtual memory management model.

14. The method of claim 2, wherein at least one of the trees is an empty tree.

15. A design system for designing an optimal virtual memory management for an application, before the physical memory to be used during execution of the application has been determined, the design system comprising:

a memory store;

a structure in the memory store representing virtual memory management design choices in a set of disjunct trees, each of said trees presenting an orthogonal design choice, such that any combination of said leafs from said disjunct trees, said combination comprising of one said leaf from each of said disjunct trees, defines a valid virtual memory management; and a computing device for selecting one leaf from at least one of the disjunct trees, thereby defining said optimal virtual memory management.

* * * * *